United States Patent
Anderson et al.

(10) Patent No.: US 8,814,484 B2
(45) Date of Patent: *Aug. 26, 2014

(54) AUTO-RACK RAILROAD CAR VEHICLE WHEEL CHOCK

(75) Inventors: John D. Anderson, Oswego, IL (US); Walter J. Peach, Montgomery, IL (US)

(73) Assignee: Standard Car Truck Company, Park Ridge, IL (US)

( * ) Notice: Subject to any disclaimer, the term of this patent is extended or adjusted under 35 U.S.C. 154(b) by 186 days.

This patent is subject to a terminal disclaimer.

(21) Appl. No.: 13/584,355

(22) Filed: Aug. 13, 2012

(65) Prior Publication Data

US 2012/0308324 A1 Dec. 6, 2012

Related U.S. Application Data

(63) Continuation of application No. 13/324,658, filed on Dec. 13, 2011, now Pat. No. 8,272,818, which is a continuation of application No. 12/892,350, filed on Sep. 28, 2010, now Pat. No. 8,096,738.

(60) Provisional application No. 61/251,524, filed on Oct. 14, 2009.

(51) Int. Cl.
*B60P 7/08* (2006.01)
*B60P 3/077* (2006.01)

(52) U.S. Cl.
CPC ..................................... *B60P 3/077* (2013.01)
USPC ................................................. 410/30; 410/7

(58) Field of Classification Search
CPC ............ B60P 3/07; B60P 3/075; B60P 3/077; B60P 7/0892; B60P 7/135; B60T 3/00
USPC .......................... 410/7, 9, 19, 30, 49; 188/32
See application file for complete search history.

(56) References Cited

U.S. PATENT DOCUMENTS

| | | | |
|---|---|---|---|
| 1,424,957 | A | 8/1922 | Tilburg |
| 1,776,935 | A | 9/1930 | Snyder |
| 2,066,714 | A | 1/1937 | Butterworth |
| 2,540,400 | A | 2/1951 | McHenry |
| 2,705,081 | A | 3/1955 | Jacobs |
| 2,730,400 | A | 1/1956 | Francis |
| 2,771,162 | A | 11/1956 | Marsh |
| 2,797,774 | A | 7/1957 | Eckhart |
| 2,853,257 | A | 9/1958 | Cook |
| 2,858,905 | A | 11/1958 | Fahland |
| 2,895,569 | A | 7/1959 | Nystrom |
| 3,119,350 | A | 1/1964 | Bellingher |
| 3,581,846 | A | 6/1971 | Janus |

(Continued)

FOREIGN PATENT DOCUMENTS

| | | |
|---|---|---|
| DE | 1265771 | 4/1968 |
| DE | 1810854 | 7/1971 |

(Continued)

*Primary Examiner* — Stephen Gordon

(74) *Attorney, Agent, or Firm* — Neal, Gerber & Eisenberg LLP

(57) ABSTRACT

An improved vehicle wheel chock for a vehicle restraint system for an auto-rack railroad car which secures a vehicle in the auto-rack railroad car. The vehicle wheel chock is configured to be positioned on a grating adjacent to a tire of the vehicle. The improved vehicle wheel chock includes an improved face-plate.

24 Claims, 26 Drawing Sheets

(56) References Cited

U.S. PATENT DOCUMENTS

| | | |
|---|---|---|
| 3,605,954 A | 9/1971 | Wakabayashi et al. |
| 3,739,906 A | 6/1973 | Cwycyshyn et al. |
| 3,895,587 A | 7/1975 | Bell |
| 4,024,820 A | 5/1977 | Hlinsky et al. |
| 4,031,983 A | 6/1977 | Lentini |
| 4,032,167 A | 6/1977 | Chereda |
| 4,060,036 A | 11/1977 | Palms |
| 4,316,686 A | 2/1982 | Cottrell et al. |
| 4,343,401 A | 8/1982 | Paulyson |
| 4,399,893 A | 8/1983 | Switzer |
| 4,615,416 A | 10/1986 | Wilson |
| 4,659,266 A | 4/1987 | Thelen et al. |
| 4,668,140 A | 5/1987 | Blunden |
| 4,676,344 A | 6/1987 | Locicero |
| 4,695,087 A | 9/1987 | Hollrock |
| 4,786,223 A | 11/1988 | Crissy et al. |
| 4,804,070 A | 2/1989 | Bohler |
| 4,836,726 A | 6/1989 | Robertson et al. |
| 4,838,743 A | 6/1989 | Blunden et al. |
| 4,875,813 A | 10/1989 | Moyer et al. |
| 4,960,353 A | 10/1990 | Thorndyke |
| 4,971,492 A | 11/1990 | Moyer et al. |
| 5,037,255 A | 8/1991 | Bullock et al. |
| 5,106,245 A | 4/1992 | Fritz et al. |
| 5,160,223 A | 11/1992 | Seitz |
| 5,302,063 A | 4/1994 | Winsor |
| 5,312,213 A | 5/1994 | Winsor |
| 5,316,421 A | 5/1994 | Bullock et al. |
| D365,078 S | 12/1995 | Zlaylek |
| D410,887 S | 6/1999 | Henry |
| D420,640 S | 2/2000 | Henry |
| D422,960 S | 4/2000 | Henry |
| 6,164,893 A | 12/2000 | Glomot et al. |
| D489,310 S | 5/2004 | Olson et al. |
| 6,835,034 B2 | 12/2004 | Winsor |
| 6,851,523 B1 | 2/2005 | Gaster |
| 6,926,480 B2 | 8/2005 | Anderson et al. |
| D516,268 S | 2/2006 | Gaster |
| 7,004,696 B2 | 2/2006 | Anderson et al. |
| 7,128,508 B2 | 10/2006 | Anderson et al. |
| 7,150,592 B2 | 12/2006 | Anderson et al. |
| 7,344,343 B2 | 3/2008 | Boydstun et al. |
| D587,183 S | 2/2009 | Blumenthal et al. |
| 7,513,725 B1 | 4/2009 | Bullock |
| D613,231 S | 4/2010 | Anderson et al. |
| 8,096,738 B2 | 1/2012 | Anderson et al. |
| 8,272,818 B2 * | 9/2012 | Anderson et al. ............... 410/30 |
| 2008/0232919 A1 | 9/2008 | Anderson et al. |
| 2009/0208304 A1 | 8/2009 | Bullock |

FOREIGN PATENT DOCUMENTS

| | | |
|---|---|---|
| DE | 2519885 A1 | 11/1976 |
| EP | 0128992 A1 | 12/1984 |
| FR | 1564196 | 4/1969 |
| FR | 2296550 | 11/1974 |
| FR | 2421768 | 11/1979 |
| FR | 2584664 A1 | 1/1987 |
| SU | 1243985 A1 | 7/1986 |
| WO | WO 8909709 | 10/1989 |

* cited by examiner

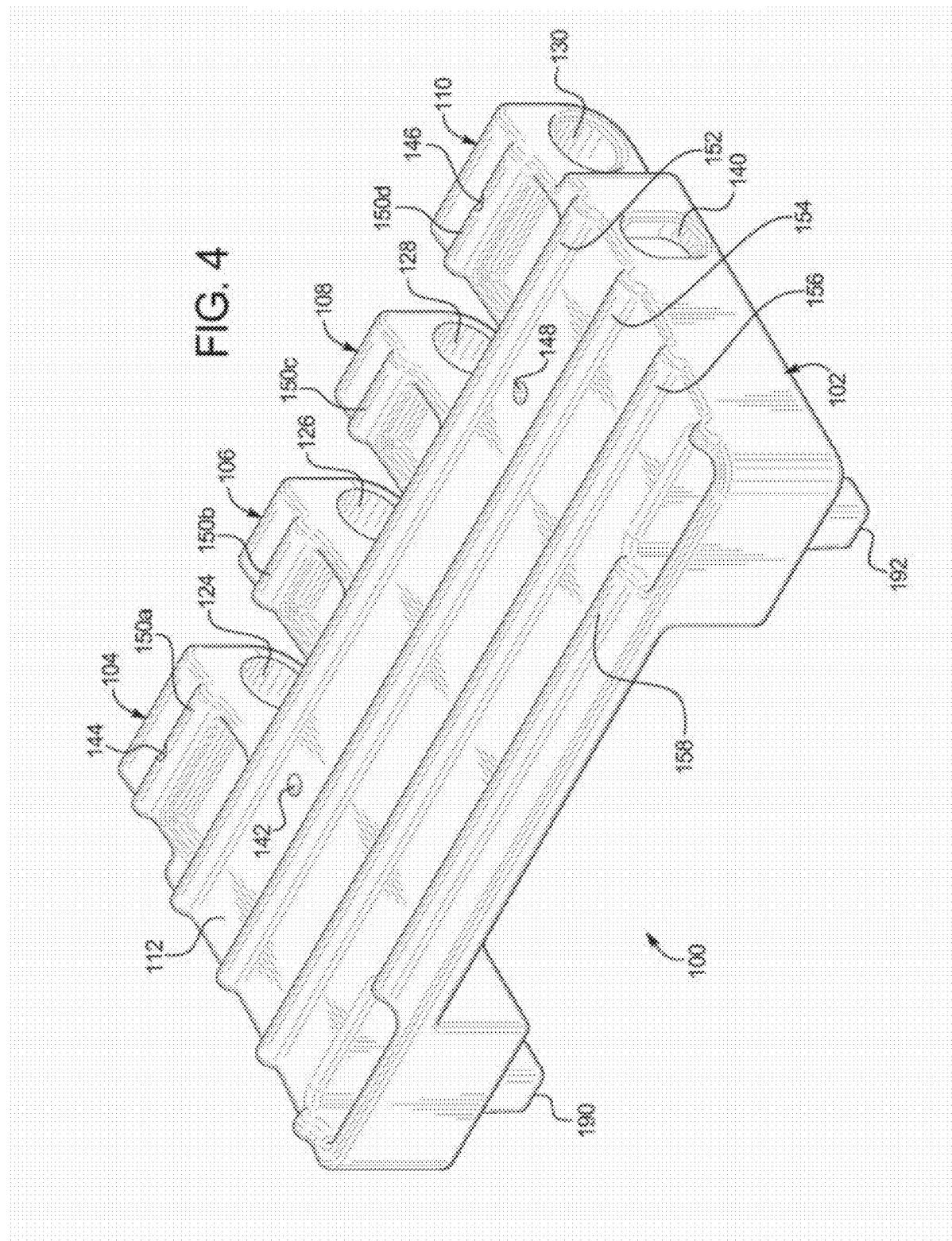

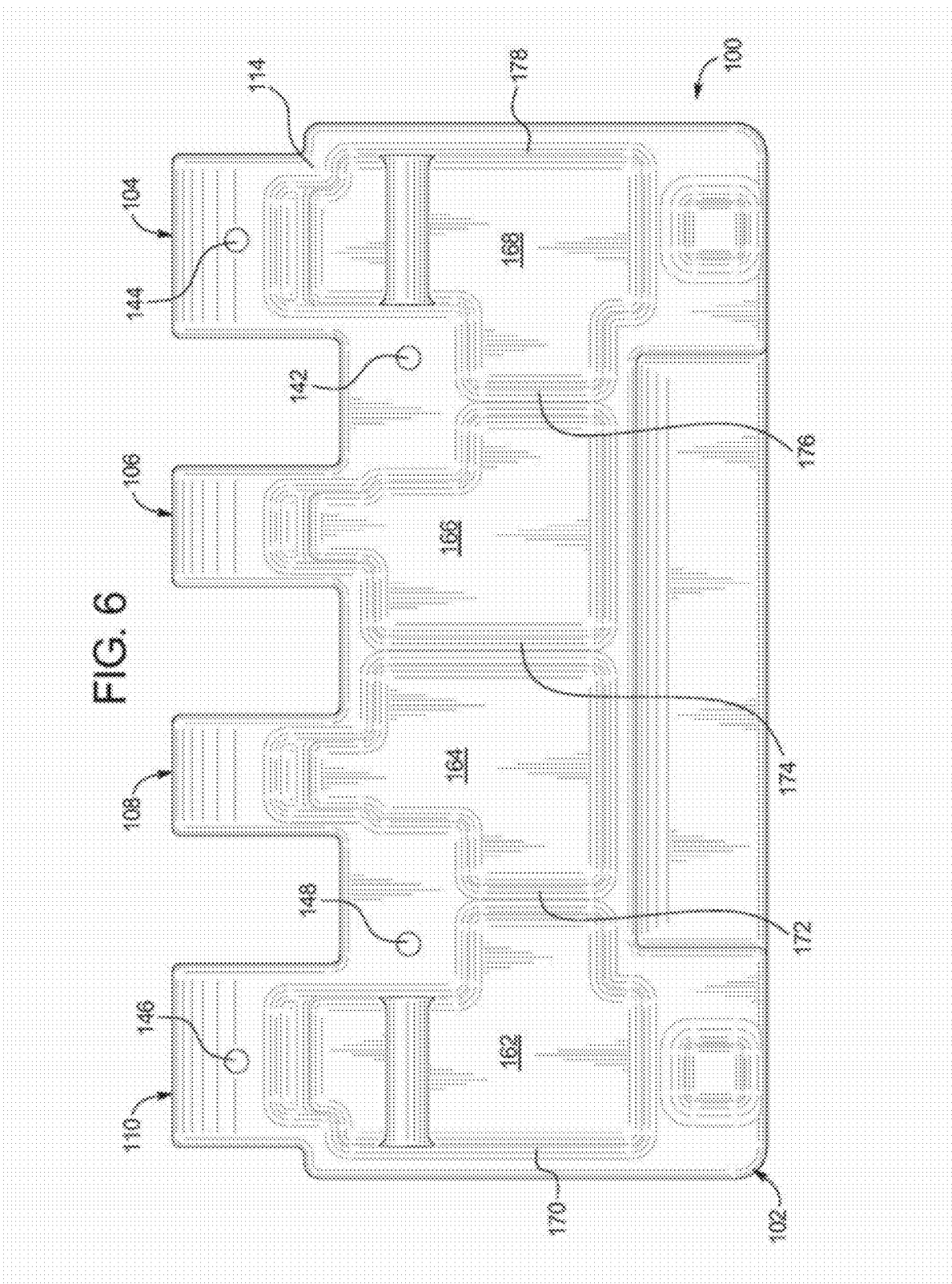

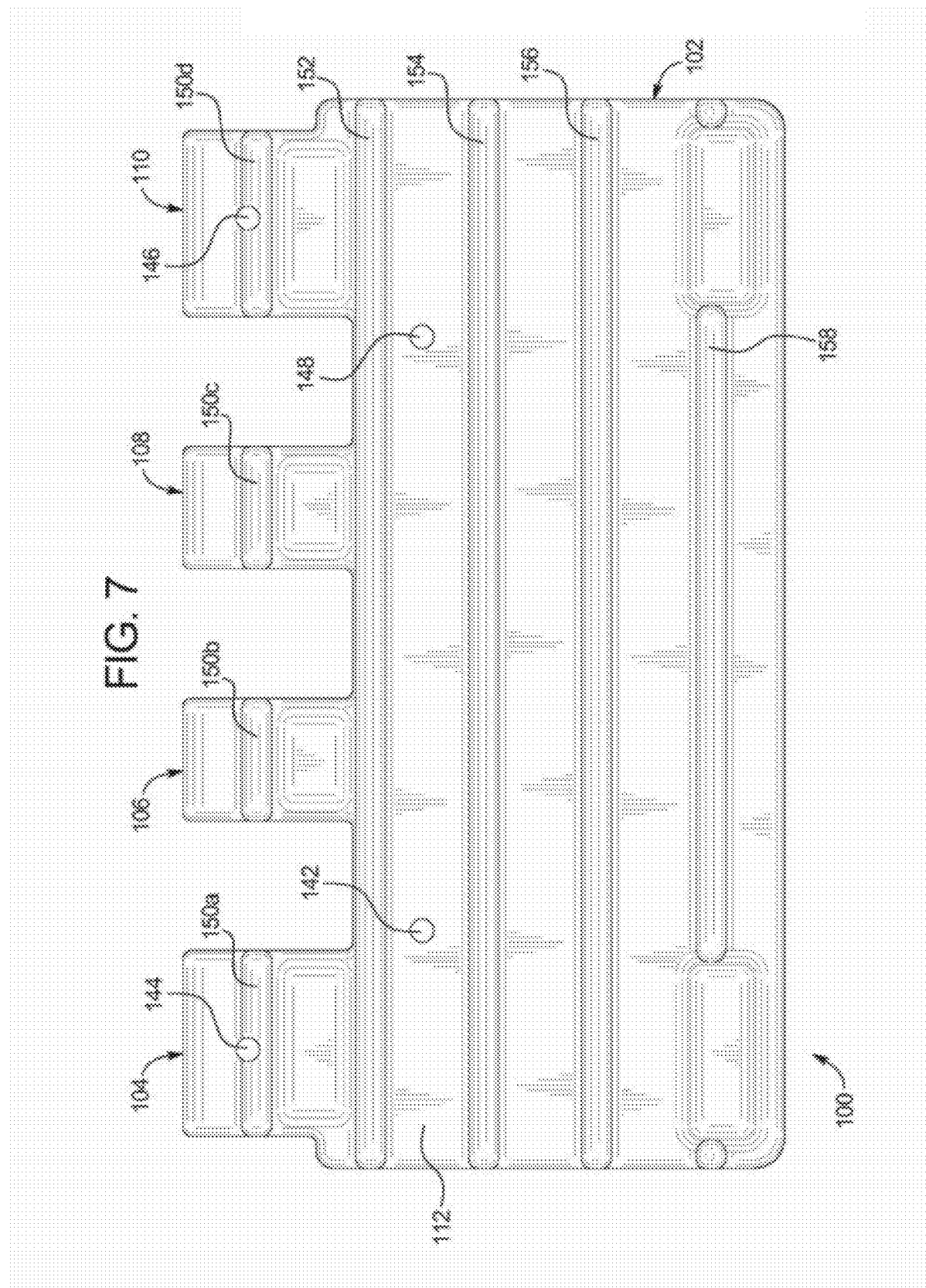

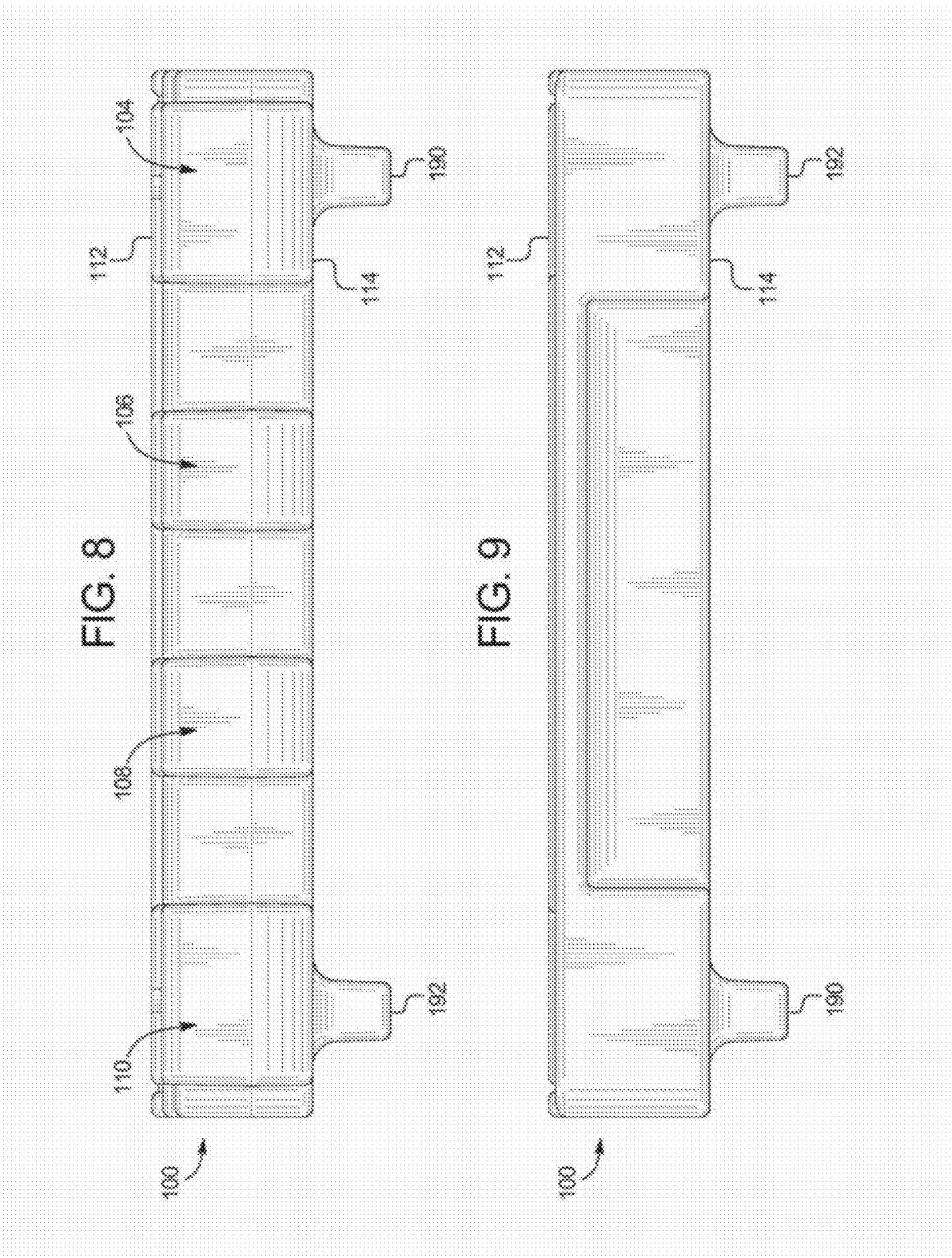

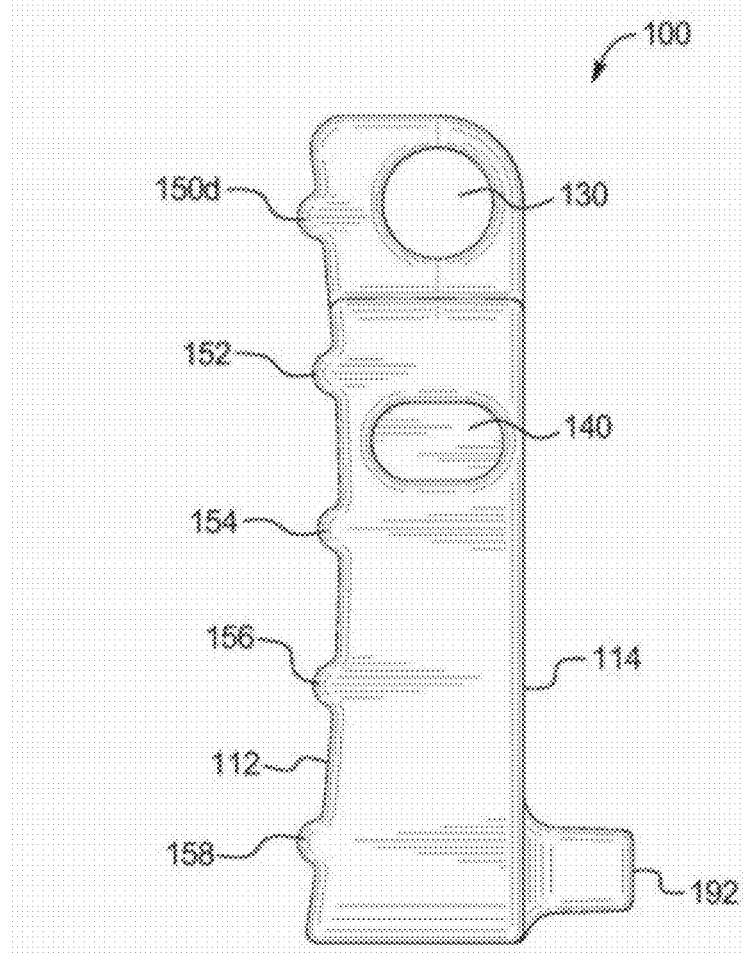

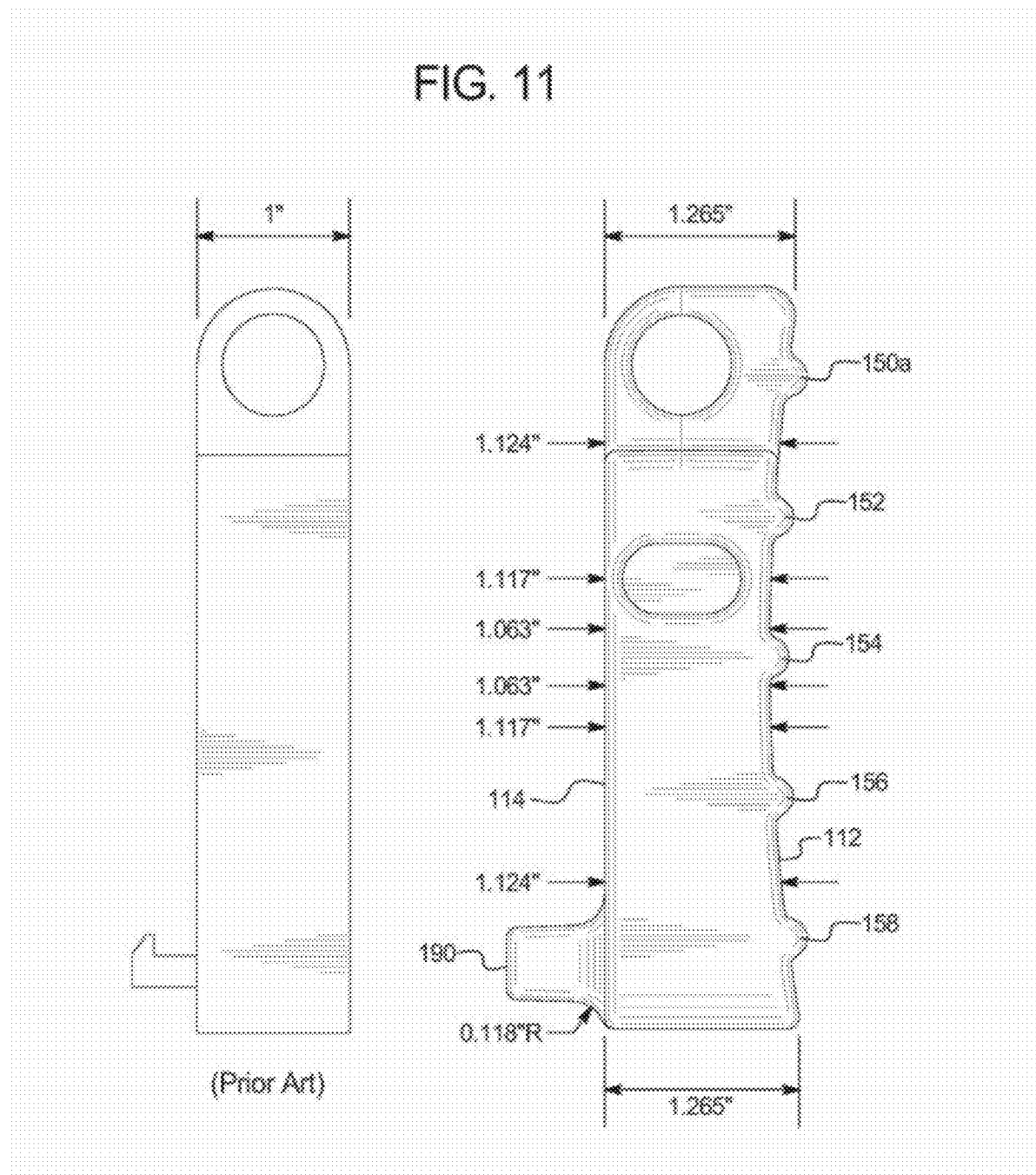

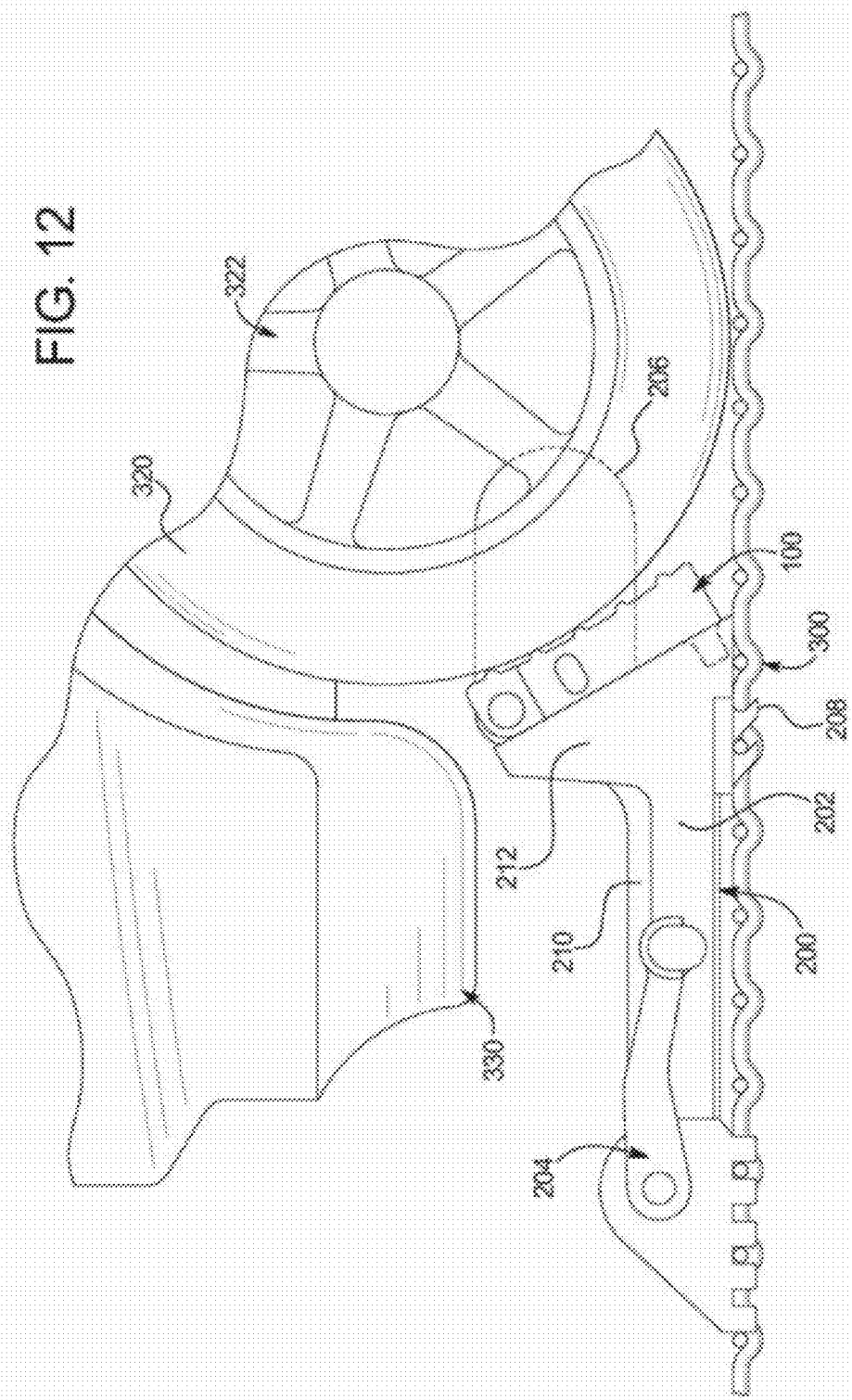

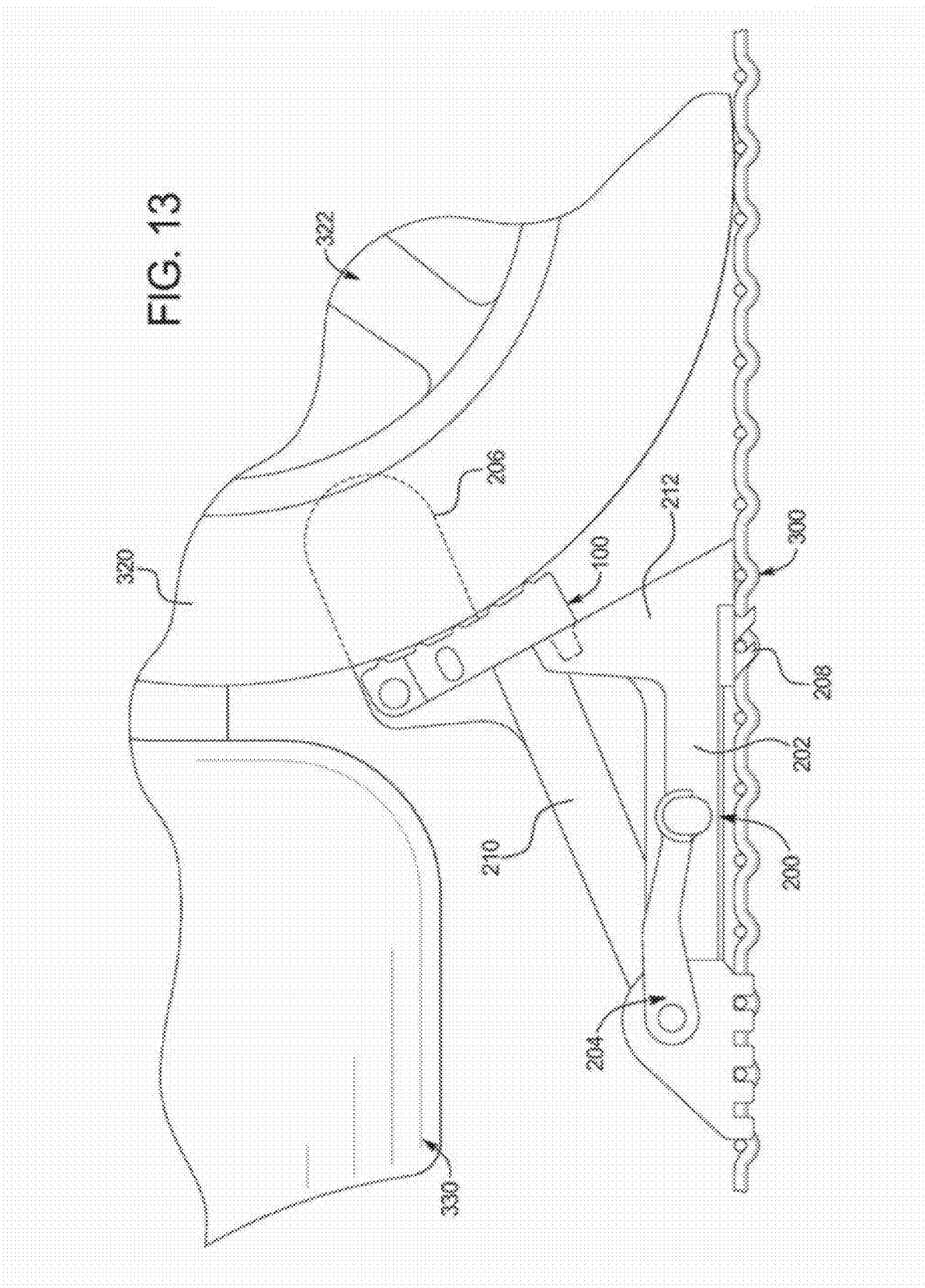

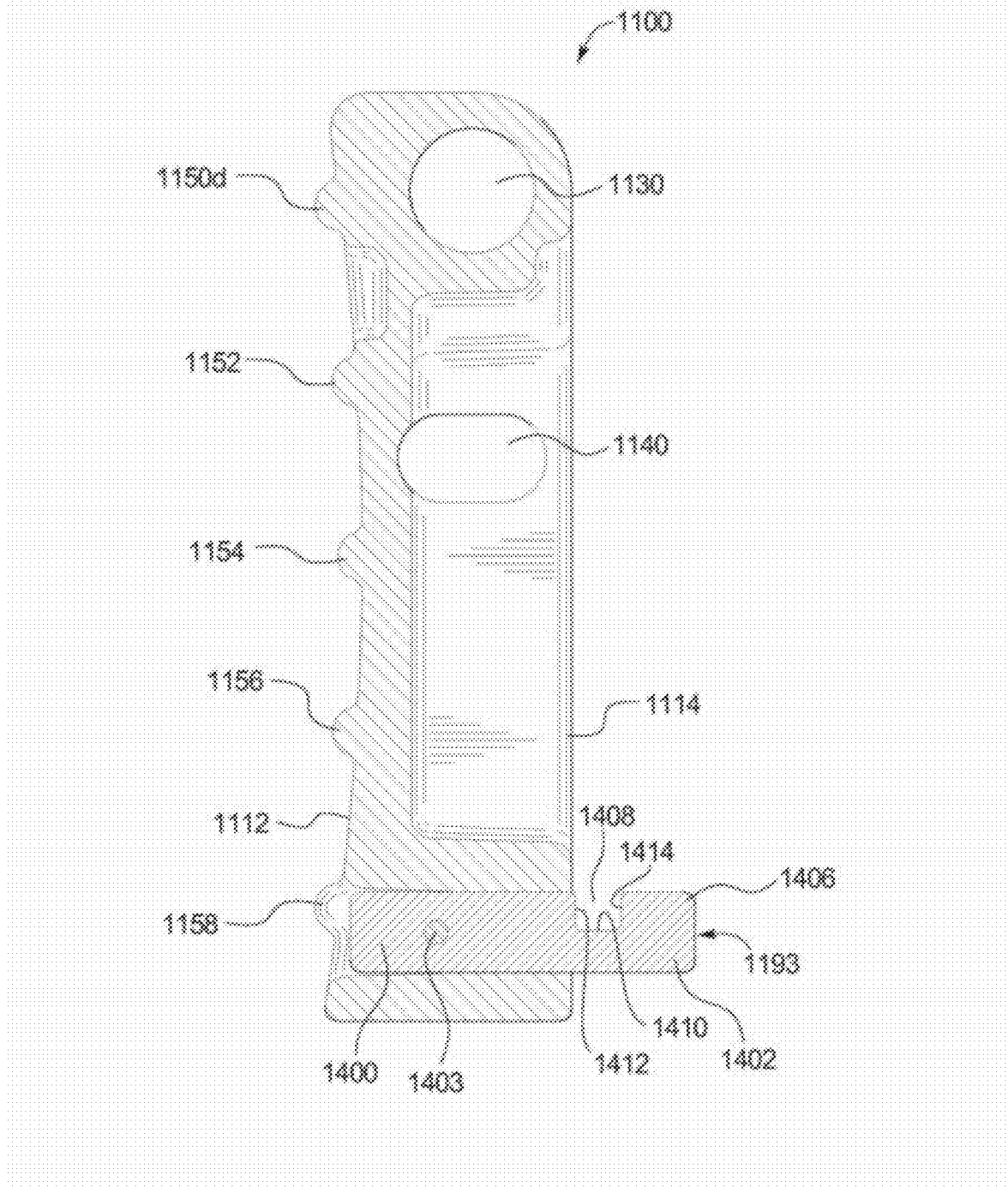

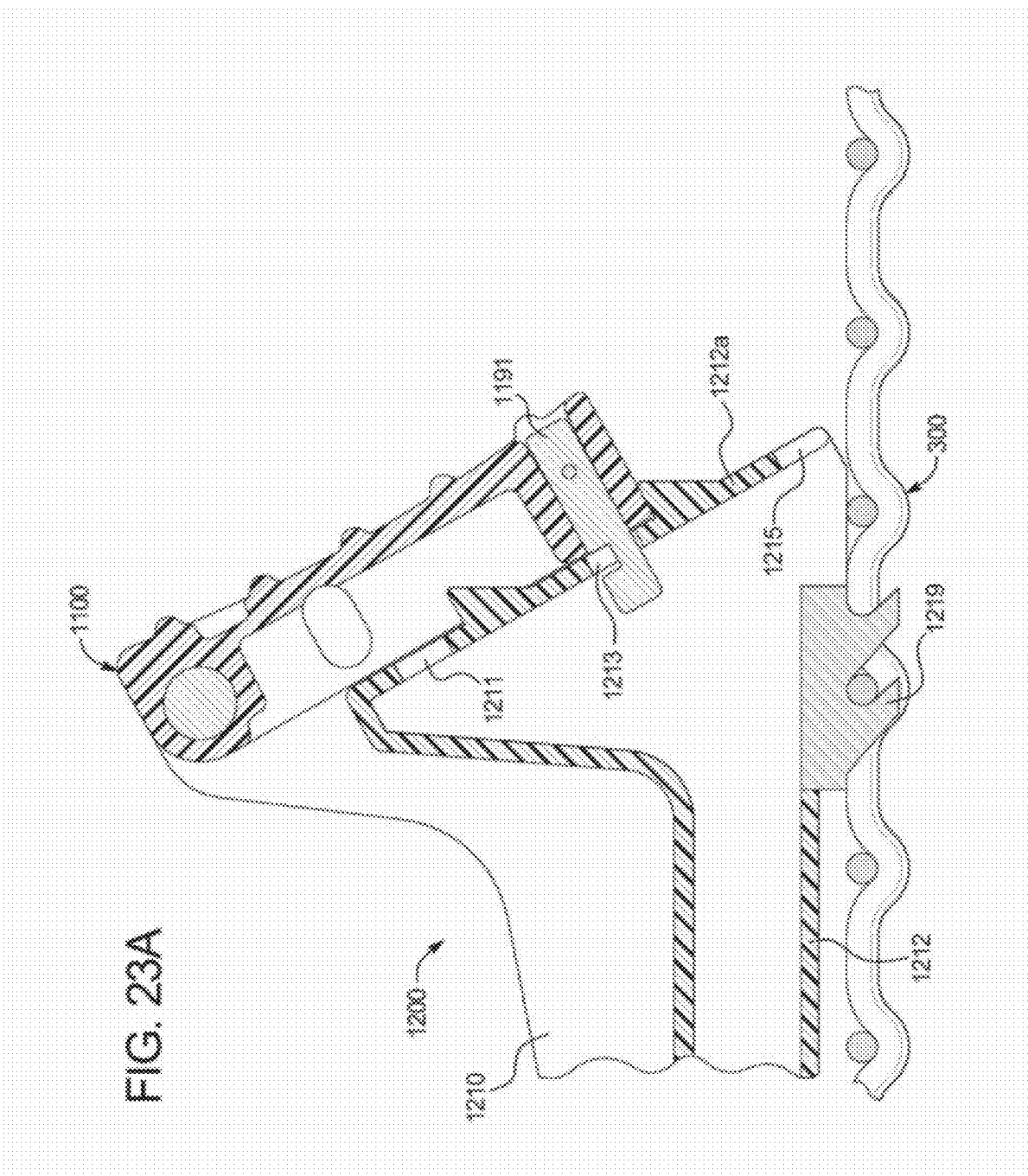

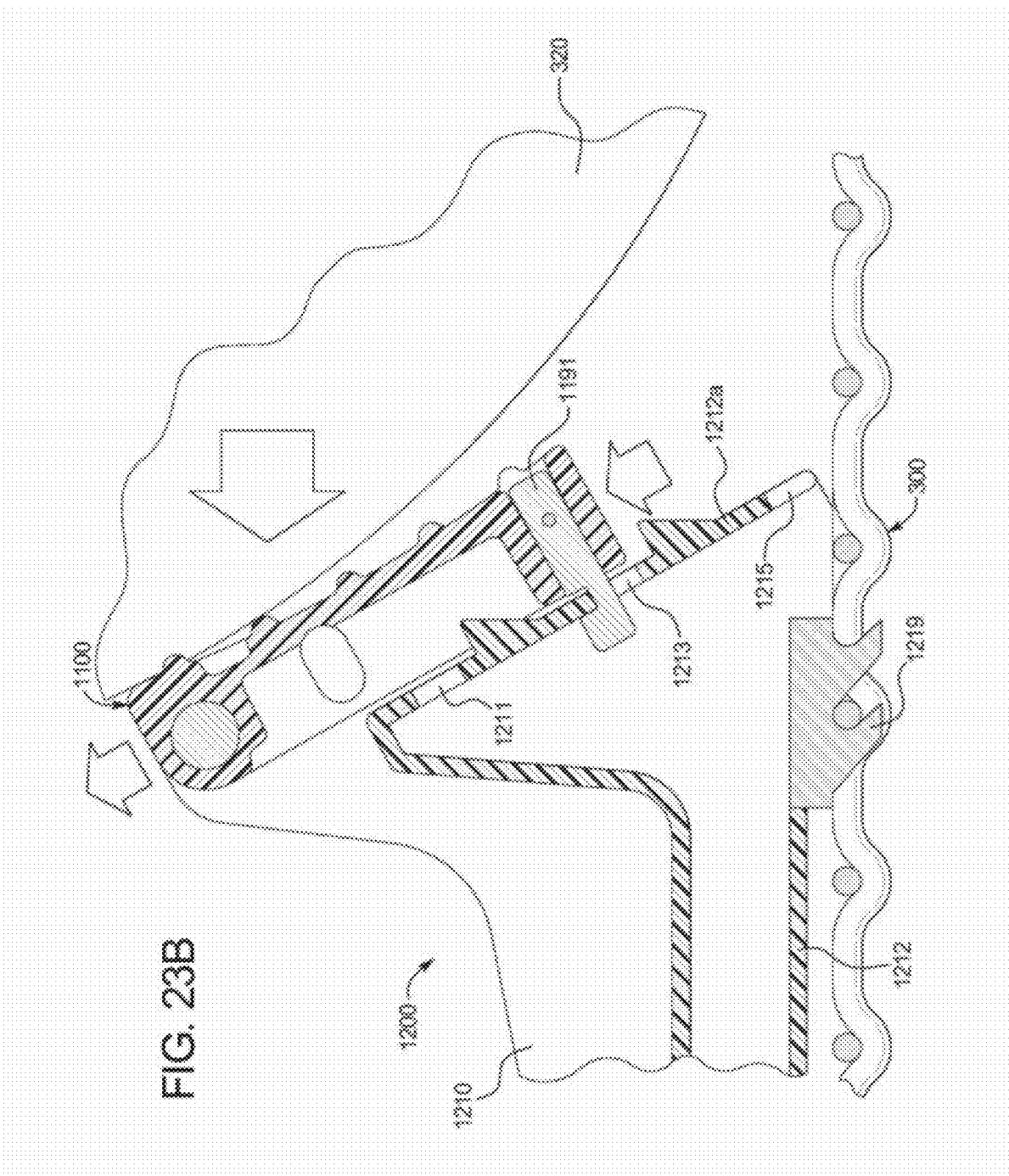

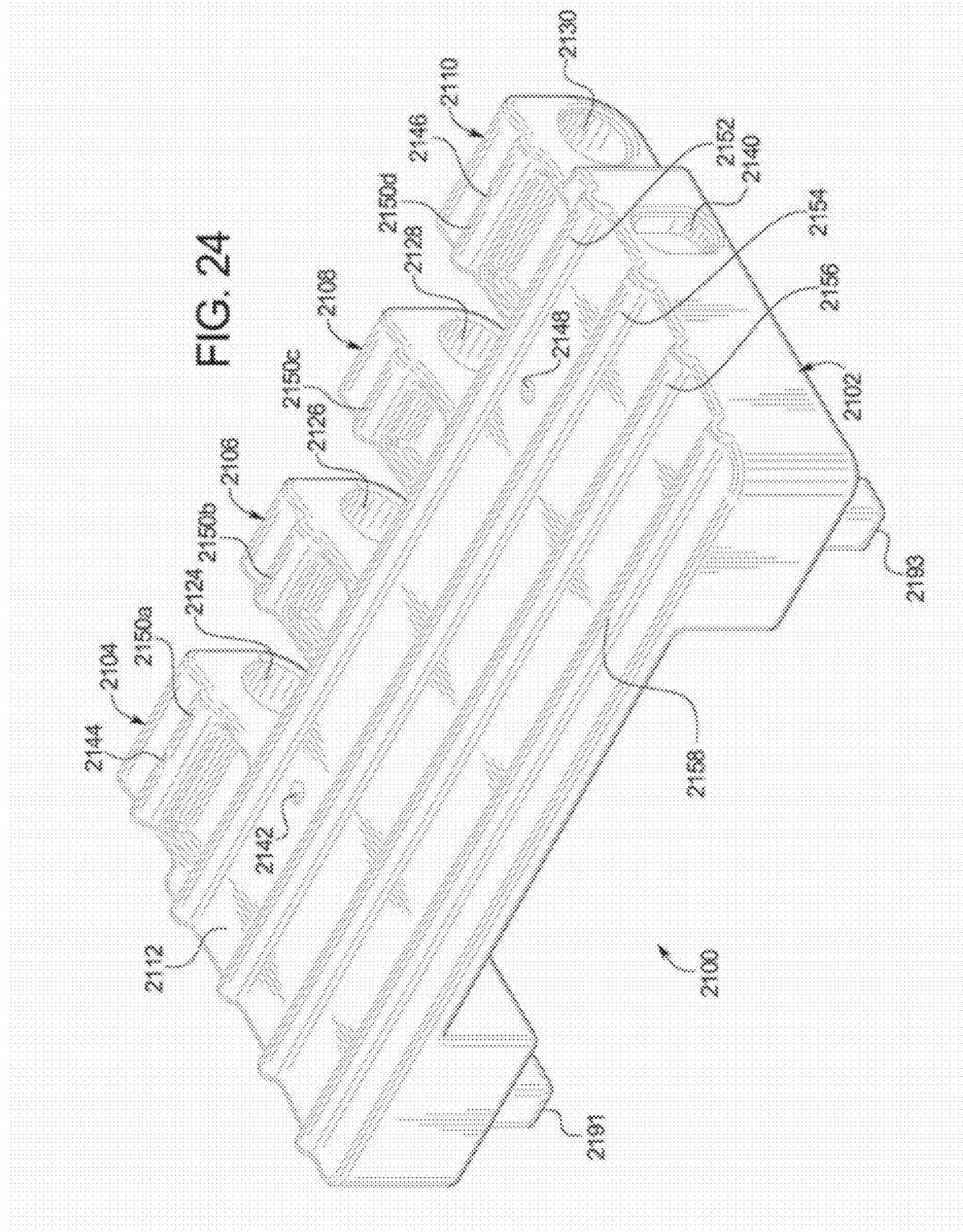

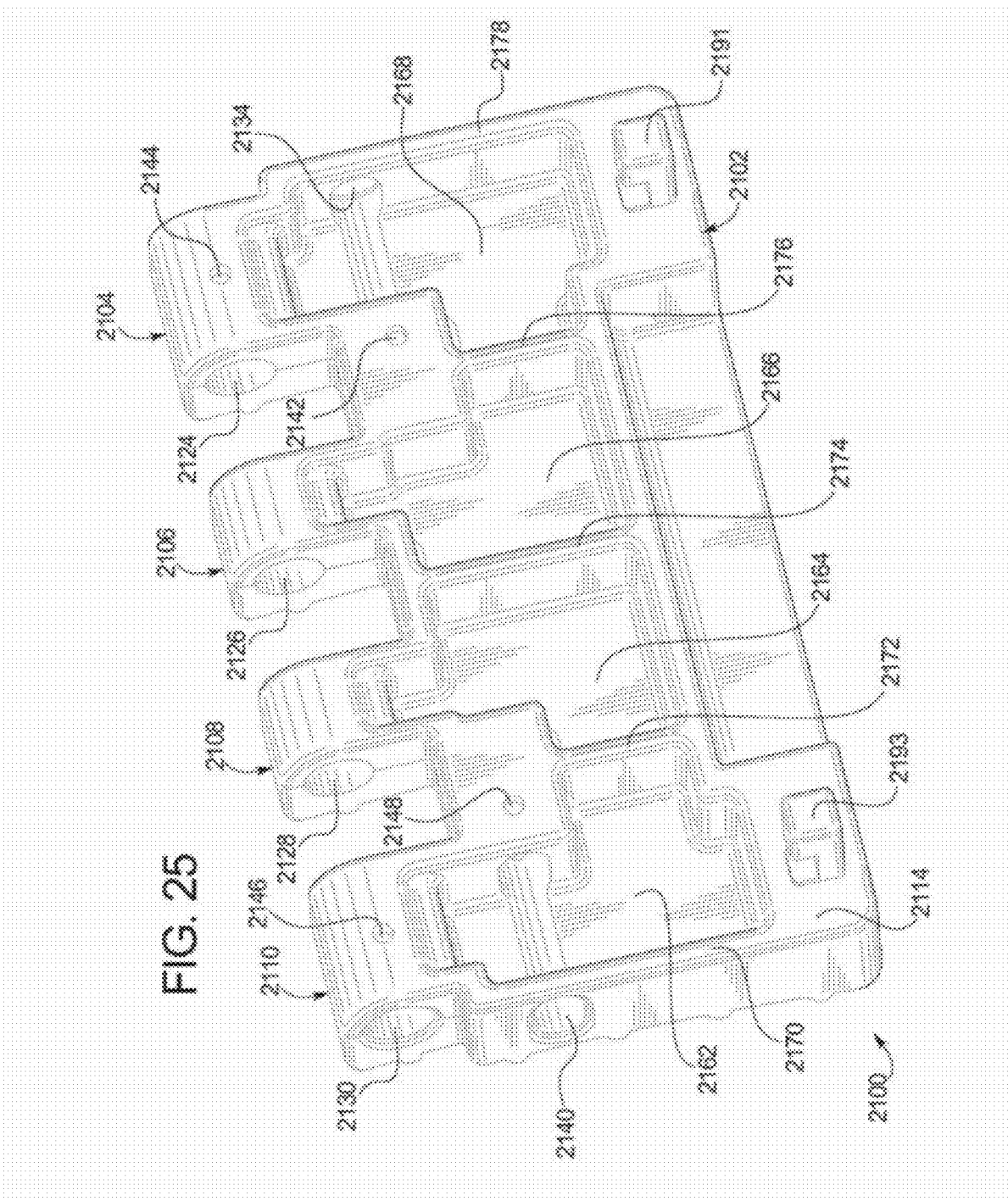

AUTO-RACK RAILROAD CAR VEHICLE WHEEL CHOCK

PRIORITY CLAIM

This application is a continuation of, claims the benefit of and priority to U.S. Non-Provisional patent application Ser. No. 13/324,658, filed Dec. 13, 2011, now U.S. Pat. No. 8,272,818, which is a continuation of, claims the benefit of and priority to U.S. Non-Provisional patent application Ser. No. 12/892,350, filed Sep. 28, 2010, now U.S. Pat. No. 8,096,738, which claims the benefit of and priority to U.S. Provisional Patent Application No. 61/251,524, filed on Oct. 14, 2009, the entire contents of which is incorporated by reference herein.

BACKGROUND

The railroad industry employs a variety of auto-rack railroad cars for transporting newly-manufactured vehicles such as automobiles, vans and trucks. Auto-rack railroad cars, known in the railroad industry as auto-rack cars, often travel thousands of miles through varying terrain. One typical type of auto-rack car is compartmentalized, having two or three floors or decks, two sidewalls, a pair of doors at each end, and a roof. Newly manufactured vehicles are loaded into and unloaded from an auto-rack car for transport by a person (sometimes called a "loader") who drives the vehicles into or out of the auto-rack car.

One problem with auto-rack cars is the potential for damage to newly manufactured vehicles which can occur in the auto-rack car due to the unwanted movement of one or more of the transported vehicles not adequately secured in the auto-rack car. Various restraint or anchoring systems have been developed for securing the vehicles transported in auto-rack cars to prevent movement or shifting of those vehicles during transportation. The loader typically operates these vehicle restraint or anchoring systems. One known type of system employs a "tie down" restraint using chains connected to steel runners in the support surface of the auto-rack car. A ratchet tool is usually required to secure these chains taut. Certain types of these known systems utilize winch mechanisms and harnesses which must be fitted over the vehicle tires to restrain movement of the vehicle. These systems are time consuming to properly install.

To solve these and other disadvantages of such mechanisms, a vehicle restraint system for restraining vehicles transported on auto-rack cars was developed. This vehicle restraint system is disclosed in detail in U.S. Pat. Nos. 5,312,213 and 5,302,063. This vehicle restraint system includes a grating and a plurality of restraints each detachably secured to the grating provided on a support surface of the auto-rack car. This system utilizes four restraints, one associated with each of the four wheels of a vehicle being transported.

As illustrated in FIGS. 2 and 2A, the restraint or vehicle wheel chock 32 of this known system includes a face-plate 34 for alignment with, and restraining movement of, a tire 40 of an associated wheel 42 of the vehicle 44 positioned on the grating 38. The face-plate 34 is vertically adjustable to a lower position (shown in FIGS. 2 and 2A), an intermediate position (not shown), and an upper position (shown in phantom in FIG. 2) to provide for different tire sizes. The face-plate 34 is attached to a load-transmitting member 36 which is adapted to transfer the load applied to the face-plate 34 to the grating 38. The restraint 32 also includes a moveable paddle-shaped restraining member 39 which contacts the inside surface of the tire to prevent lateral shifting of the tire and thus of the vehicle. The paddle shaped restraining member 39 is connected to the face-plate 34 such that when the face-plate is vertically adjusted, the paddle shaped restraining member is vertically adjusted. For several years, this vehicle restraint system has been widely employed in auto-rack cars to secure vehicles.

Various problems have developed with this vehicle restraint system especially in relation to new types or designs of vehicles such as "cross-over" vehicles and other vehicles with different body and particularly different fender, molding or trim profiles. For example, cross-over vehicles generally include a truck or SUV-type body mounted on an automobile-type frame. These cross-over vehicles have a higher center of gravity, a much lower curb weight than conventional automobiles and SUV's, and include relatively low fenders, moldings, trim and bumpers (compared to certain trucks, vans and SUVs). Other new vehicles also have relatively low fenders, moldings, trim and bumpers. When such vehicles are loaded in an auto-rack railroad car on the grating, it has been found that these known vehicle restraints are not adequately holding the vehicles in place or adequately preventing the movement of the vehicles to a minimum desired level of movement. This lack of restraint occurs, at least in part, because the adjustable member or face-plate 34 of such above described restraints cannot be mounted or positioned with the face-plate in the intermediate or highest position because it will or may interfere with or contact the relatively low bumper, fender, trim or molding of the vehicle as illustrated in phantom in FIG. 2. Vehicle manufacturers want to avoid such contact or potential contact during the transportation of the vehicles to avoid damage to the vehicles.

More specifically, it should be appreciated that vehicle manufacturers provide extremely particular instructions which warn against any contact or engagement between anything in the auto-rack railroad cars and the new vehicles because the vehicle manufacturers desire to deliver the newly manufactured vehicles to dealers and their customers in "perfect" condition. Any damage, such as scratches or dents to the fenders, bumpers, moldings, trim or other parts of the vehicle, could prevent or inhibit a customer from purchasing or taking delivery of the vehicle, and generally need to be fixed prior to sale of the vehicle. Accordingly, vehicle manufacturers prefer that the restraint not contact and not come close to being in contact with the fenders, bumpers, trim or moldings of the newly manufactured vehicles being transported. The face-plate 34 of the above described restraint must accordingly be placed in the lowest or, at best, the intermediate position when securing many presently manufactured vehicles in the auto-rack cars. This causes the face-plate to engage the tire at a lower point on the tire, and accordingly, the vehicle is more likely to be able to jump over or hop the restraint (as illustrated in FIG. 3) if the vehicle is subjected to sufficient forces.

Even when the face-plate is in the highest or intermediate position, other problems with holding the tire in place often occur, especially where the vehicles do not have locking steering columns. The cause for these problems is that the face-plate does not securely engage the tire or enough of the tire and the paddle-shaped restraining member 39 contacts the side of the tire 40 at too high of a position which allows the tire to turn and to be disengaged from the face-plate of the restraint 32 as generally illustrated in FIG. 3A. In certain instances, the vehicle literally "walks out" of this restraint 32 as illustrated in FIG. 3A. This illustration is generally of a photograph taken inside an auto-rack railroad car employing the above described vehicle restraint system.

It should be appreciated that each tire of vehicle has a safe zone of operation (in front and in back of the tire) for a vehicle restraint system. Each safe zone is a somewhat triangular area in front of or in back of the tire. Each safe zone defines the space in which a vehicle restraint system can operate without the potential for contacting the fenders, trim, moldings or bumpers of the vehicle. For example, safe zones 41a and 41b for a tire 40 of an automobile are generally illustrated in FIG. 3B. The above described vehicle restraint system functions outside of those safe zones for many vehicles, as generally illustrated in FIG. 2A which shows (in phantom) that when the face-plate 34 is in the preferred uppermost position, it is outside the safe zone 41a. Therefore, as mentioned above, the face-plate of the restraint 32 often needs to be placed in the lowest or intermediate position to stay within the respective safe zone and prevent damage or potential damage to the fender, trim, molding and bumper of the vehicle.

A related problem which can also cause a vehicle to be more likely to jump over or hop this restraint is that the restraint is sometimes not placed as close to the tire as potentially possible as illustrated in FIG. 2. One reason for this is that the loaders are in a hurry when they load the vehicles into the auto-rack railroad cars. When the loaders are in a hurry, they tend to place the restraint in a position close to the tire without substantially maneuvering the restraint to the closest possible position to the tire. This positioning can sometimes leave a substantial gap between the restraint and the tire. This gap coupled with a low face-plate position can allow the vehicle to build up speed causing the vehicle to hop or jump the restraint.

A similar problem arises because the restraint may need to be positioned or spaced at a distance from the tire because the tire is at a position on the grating or relative to the grating that does not allow the restraint to be placed in engagement with the tire. The restraint in certain instances is placed up to a distance of three-quarters of an inch away from the tire due to the position of the grating members or rungs relative to the tire and the three sets of locking members of this restraint. Again, in such situations, a gap is created allowing the vehicle to more easily hop or jump the restraint. This is also illustrated in FIG. 2 where the size of the gap between the tire and the face-plate is approximately half the distance between the rungs of the grating. This gap problem is compounded because certain vehicle manufacturers require that certain vehicles be transported with the transmission in neutral to prevent damage to the vehicle (such as damage to the transmission of the vehicle). In neutral, the transmission does not stop the vehicles from moving.

These problems are further often amplified because only a relatively small portion of the face-plate 34 of the known restraint engages the tire. Specifically, as shown in FIG. 2 of U.S. Pat. No. 5,312,213, the tire engages the face-plate 34 along a relatively narrow horizontally extending portion of the flat front face of the face-plate 34.

It should also be appreciated that the vehicles may jump or hop these restraints at a variety of different times such as during movement of the train including sudden stoppage of the auto-rack car or severe deceleration of the auto-rack car. Such instances can include sudden stopping for emergencies alone or in combination with slack action. The amount of force on the vehicles being transported relative to the auto-rack car can cause the vehicles to hop or jump over the restraint, especially if the tire is engaged by the face-plate at a relatively low point, if the restraint is spaced from the tire, if the face-plate is at a low position and spaced from the tire or even when engaged, does not fully engage the tire.

More importantly, during switching in a railroad yard, the auto-rack cars are coupled and decoupled with other railroad cars in different freight trains on a regular basis. During the coupling action, severe jolts of up to 8 to 10 miles per hour can be incurred by the auto-rack car even though regulations (and signs in the railroad yards and on the railroad cars) limit the speed to no more than 4 miles per hour. These jolts can cause extreme force on the vehicles relative to the railroad cars and, thus, cause the vehicles to jump or hop these restraints especially if the tire is engaged by the face-plate at a relatively low point, if the restraint is spaced from the tire, and if the engagement with the face-plate is along a narrow horizontally extending portion of the flat front face of the face-plate. When a vehicle hops or jumps a restraint, the vehicle may engage another vehicle in the auto-rack car or one or more end doors of the auto-rack car. There have been significant recorded instances of this type of damage to vehicles in auto-rack cars in railroad yards in recent years. As indicated above, such damage to the vehicles necessitates the replacement of the damaged part or parts and potentially other parts of the vehicle. This damage is extremely expensive for vehicle manufacturers which charge the railroads for such damage.

This problem is compounded for vehicle manufacturers when the vehicle damaged is a specially ordered vehicle (instead of a stock vehicle) for a specific customer. The customer can wait one, two, three or more months for a specially ordered vehicle. If the specially ordered vehicle is damaged in transit, the customer may need to wait for another specially ordered vehicle to be manufactured. This can harm the dealer's and manufacturer's businesses.

The restraints are also often damaged when the vehicles jump the restraint or run into the restraints with sufficient forces. The railroads have to replace these damaged restraints or have these damaged restraints repaired or reconstructed. This causes additional expenses to be incurred by the railroads. It should also be appreciated that these restraints can often not be easily and quickly repaired in the field and thus have to be shipped to a repair facility.

It should thus be recognized that while the vehicle restraint system described above, which has been widely commercially implemented, secures many vehicles being transported in auto-rack cars, in many instances this vehicle restraint system does not adequately protect the vehicles or prevent the movement of the vehicles and thus prevent damage to the vehicles or the restraints themselves. The automobile industry and the railroad industry have sought improvements of this vehicle restraint system.

Various improvements have been proposed. For example, U.S. Pat. Nos. 6,926,480, 7,004,696, 7,128,508, and 7,150,592 disclose supplemental restraints which are configured to work with these restraints. In another example, U.S. Pat. No. 6,835,034 discloses a second restraint configured to work in conjunction with the above described restraints. One concern with such additional devices is that the loaders of the vehicles on the auto-rack cars need to position (when loading) and remove (when unloading) both the restraints and these additional devices. This takes additional time and effort during the loading and unloading process. Additionally, these multiple devices add more cost and complications. In another example, U.S. Pat. No. 6,851,523 discloses an alternatively configured restraint. This restraint has not been commercialized. Thus, many attempts have been made to improve the above described restraint, but all of these attempts have not been successful.

Accordingly, there is a continuing need for an improved vehicle wheel restraints which are easy to install and remove, is attachable to the grating existing in the auto-rack cars, which holds the vehicles and specifically the tire more securely, and which is easy to repair in the field.

SUMMARY

The present disclosure solves the above problems by providing an improved vehicle wheel chock for an auto-rack car which more fully secures a vehicle being transported in an auto-rack car and reduces the movement of the vehicles being transported in the auto-rack car. The present disclosure contemplates that for most vehicles, one improved vehicle wheel chock will be positioned adjacent to each tire of the vehicle being transported (i.e., four improved chocks in total to secure the vehicle). After a vehicle is loaded in an auto-rack car on the gratings, each improved chock is positioned directly adjacent to each respective tire of the vehicle and is attached to the grating which extends under that tire. It should be appreciated that the improved vehicle wheel chock of the present disclosure can be employed in other transportation vehicles such as tractor trailers and shipping containers. It should also be appreciated that one or more of the improved chocks disclosed herein can work with one or more of the prior known chocks to secure a vehicle. For example, two improved chocks can be employed with two known chocks to hold a vehicle. Thus, the use of the improved chocks disclosed herein can be phased in over time.

The present disclosure provides an improved wheel chocking system for restraining road vehicles being transported on gratings disposed in transport containers such as auto-rack railroad cars. Each improved vehicle wheel chock, which is sometimes referred to herein as the improved chock, is similar to the vehicle wheel chock disclosed in U.S. Pat. Nos. 5,312,213 and 5,302,063, except that the improved chock disclosed herein includes a substantially improved face-plate which dramatically improves the performance of the vehicle wheel chock disclosed in U.S. Pat. Nos. 5,312,213 and 5,302,063. Thus, each improved chock of the present disclosure generally includes: (a) a base; (b) a locking assembly configured to engage and lock the base onto the grating; (c) an improved face-plate directed to the tread surface of a tire of its associated wheel to restrain the vehicle; (d) a load transferor; and (e) a lateral restrainer configured to prevent lateral shifting of the tire, associated wheel and vehicle positioned on the grating.

Depending on the size of the vehicle and tires, in the lower position, for some vehicles in the intermediate position, and for some vehicles in the highest position, the improved chock is configured to extend in the safe zone between the tire and the adjacent fender, molding, trim or bumper and engage a significant portion of the tire while not touching the fender, molding, trim or bumper. This improved chock enables a loader to position the improved chock in better engagement with the tire. The improved face-plate is also substantially better suited to distribute the forces from the tire (and vehicle) over a greater surface area than the face-plate described in U.S. Pat. Nos. 5,312,213 and 5,302,063.

Other objects, features and advantages of the present disclosure will be apparent from the following detailed disclosure, taken in conjunction with the accompanying sheets of drawings, wherein like reference numerals refer to like parts.

BRIEF DESCRIPTION OF THE FIGURES

FIG. 4 is a front perspective view of one embodiment of the unproved face-plate of the improved vehicle wheel chock of the present disclosure.

FIG. 6 is a rear view of the improved face-plate of FIG. 4.

FIG. 7 is a front view of the improved face-plate of FIG. 4.

FIG. 8 is a top view of the improved face-plate of FIG. 4.

FIG. 9 is a bottom view of the improved face-plate of FIG. 4.

FIG. 10 is a right side view of the improved face-plate of FIG. 4.

FIG. 11 is a side view of the improved face-plate of FIG. 4 compared with the side view of the prior art face-plate.

FIG. 12 is a schematic fragmentary side view of a vehicle and a side view of the improved vehicle wheel chock of the present disclosure, the chock on the grating, and the improved face-plate in its lowest position.

FIG. 13 is a schematic fragmentary side view of a vehicle and a side view of the improved vehicle wheel chock of the present disclosure, the chock on the grating, and the improved face-plate in the highest position

FIG. 22 is a cross-sectional view of the improved face-plate of FIG. 18, illustrating the position of one of the engagement pins.

FIGS. 23A and 23B are schematic fragmentary cross-sectional views of the improved vehicle wheel chock including the improved face-plate of FIG. 18, and showing the position of one of the engagement pins prior to and after a tire contacts the upper surface of the improved face-plate.

FIG. 24 is a front perspective view of another embodiment of the improved face-plate of the improved vehicle wheel chock of the present disclosure, the improved face-plate including spaced-apart engagement pins molded into the body of the face-plate.

FIG. 25 is a rear perspective view of the improved face-plate of FIG. 24.

DETAILED DESCRIPTION

Figure 1:
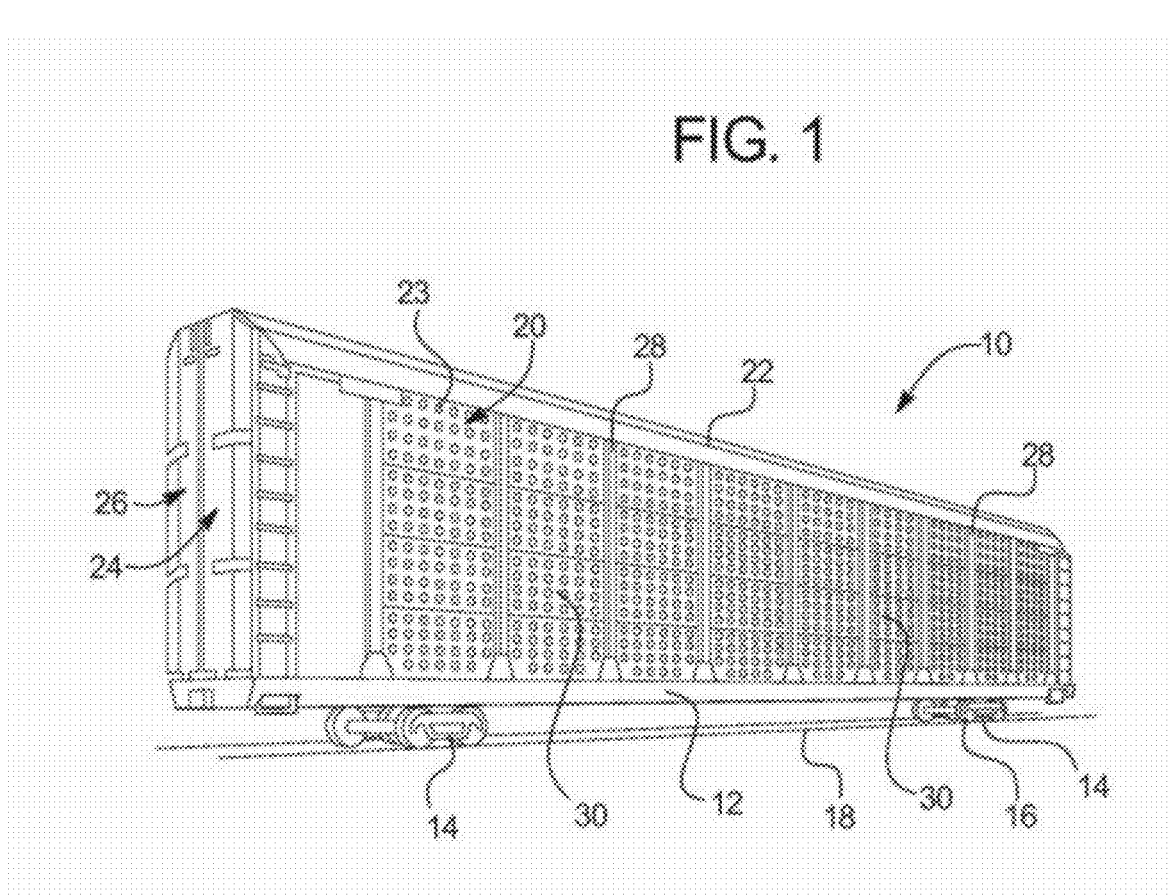
FIG. 1 is a perspective view of an auto-rack railroad car configured to transport a plurality of vehicles.
Figure 2:
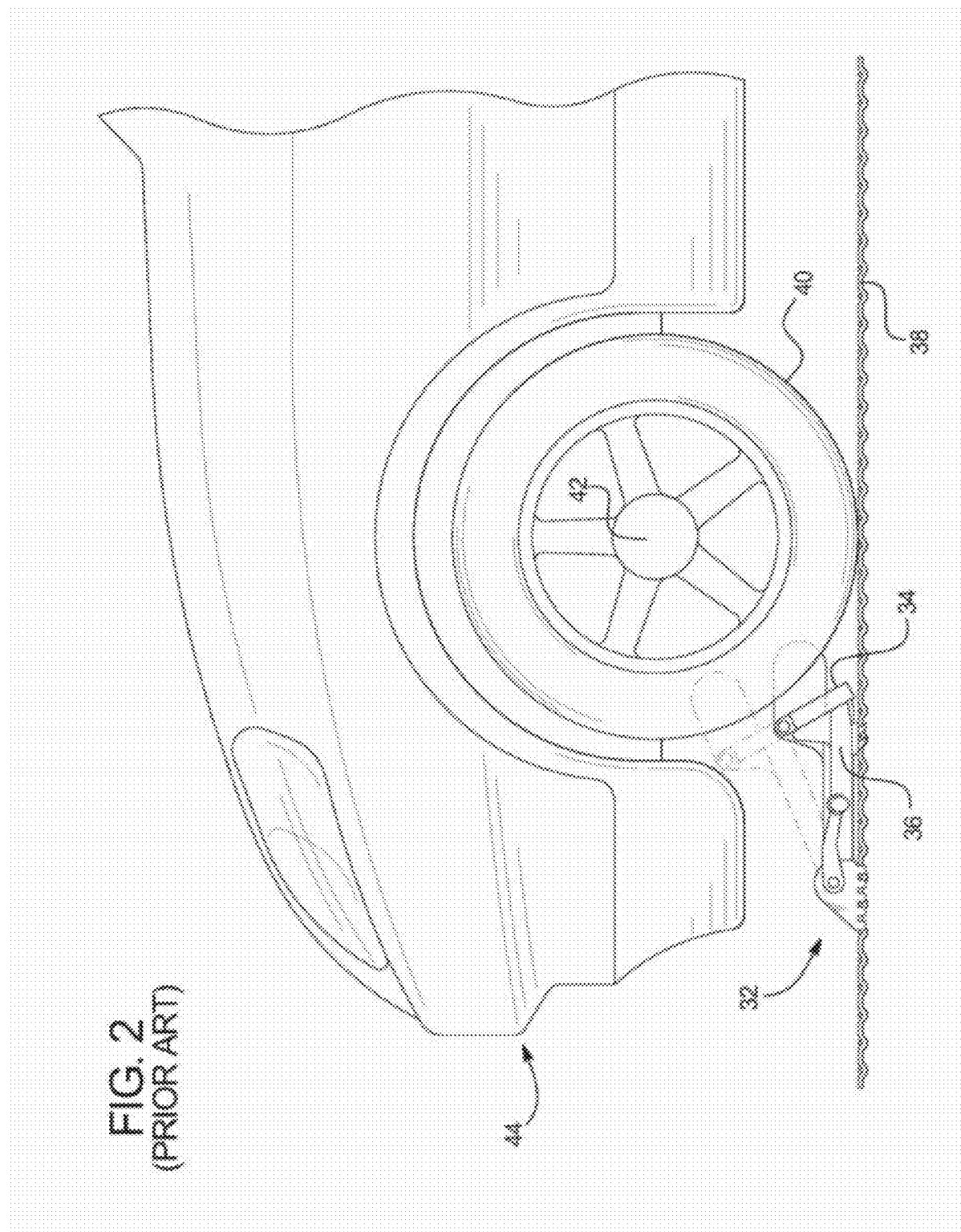
FIG. 2 is a fragmentary side view of a vehicle and a side view of the prior art restraint in an auto-rack car illustrating a grating on which the vehicle rests, the restraint releasably attached to the grating, the face-plate of the restraint in its lowest position, and the face-plate of the restraint shown in phantom in the highest position which would interfere with the fender of the vehicle.
Figure 2A:
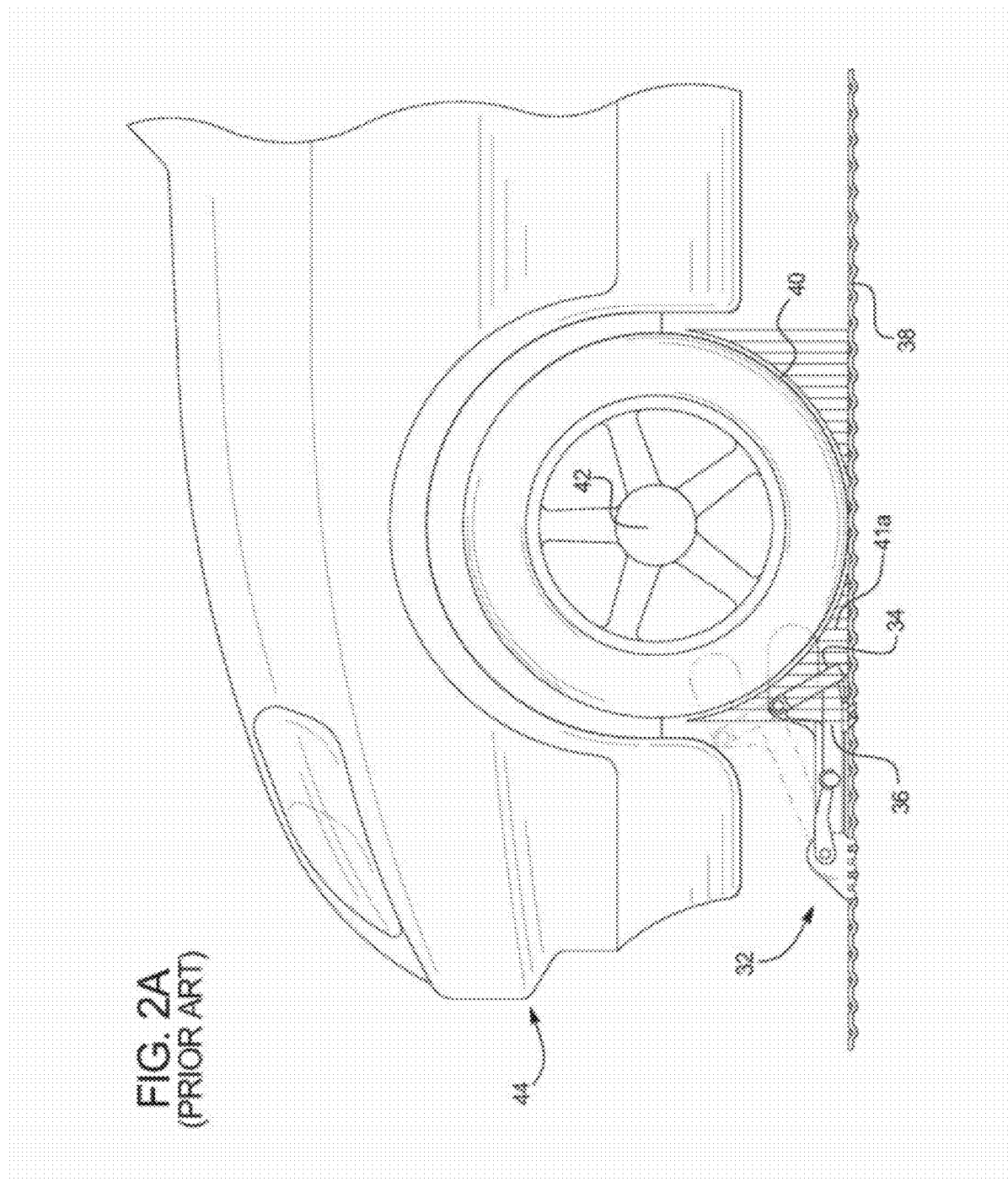
FIG. 2A is a fragmentary side view of a vehicle and a side view of the prior art restraint in an auto-rack car illustrating the restraint in its lowest position, and the face-plate of the restraint shown in phantom in the highest position and outside of a safe zone for the vehicle.
Figure 3:
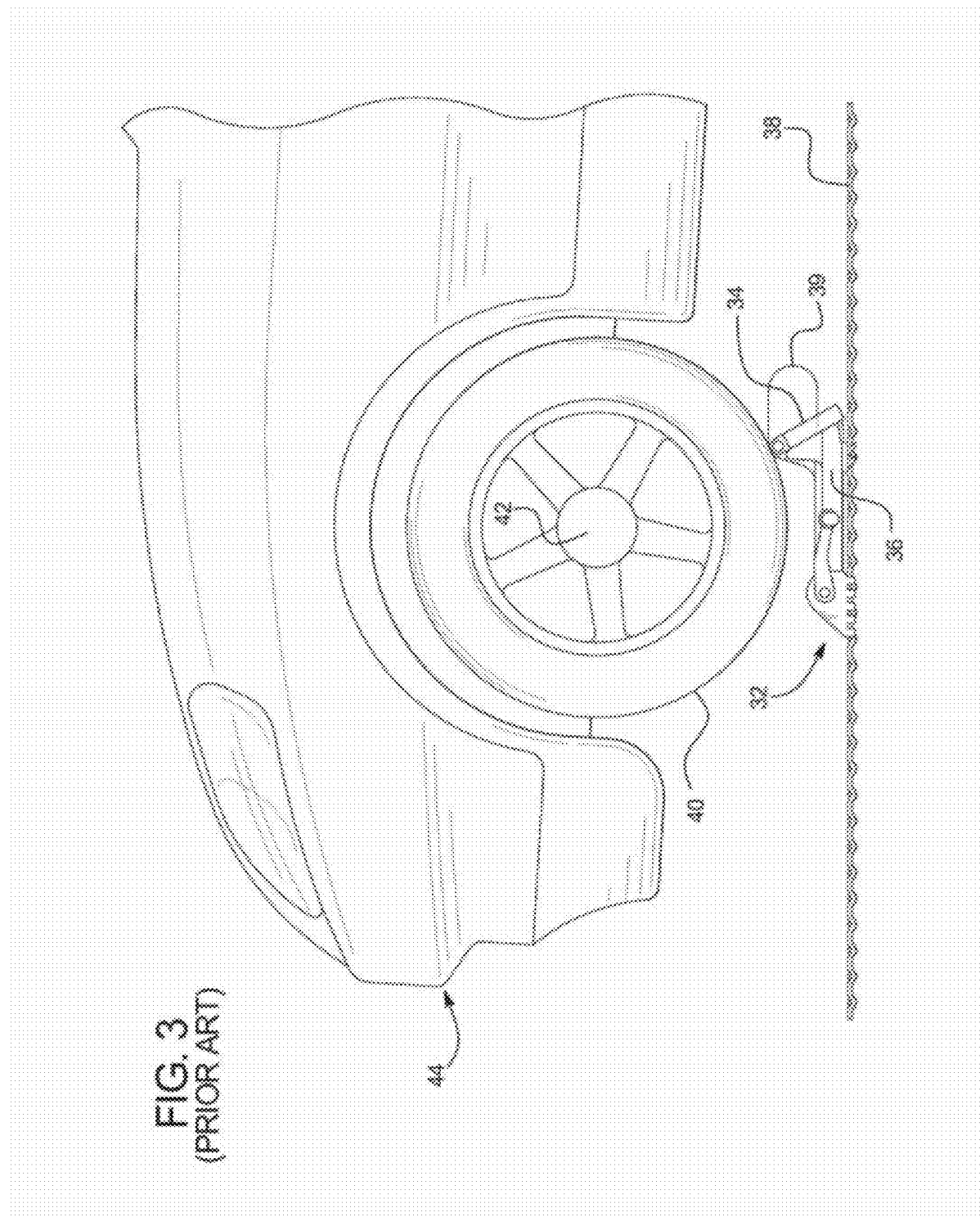
FIG. 3 is a side view of a vehicle which has jumped the prior art restraint illustrated in FIG. 2.
Figure 3A:
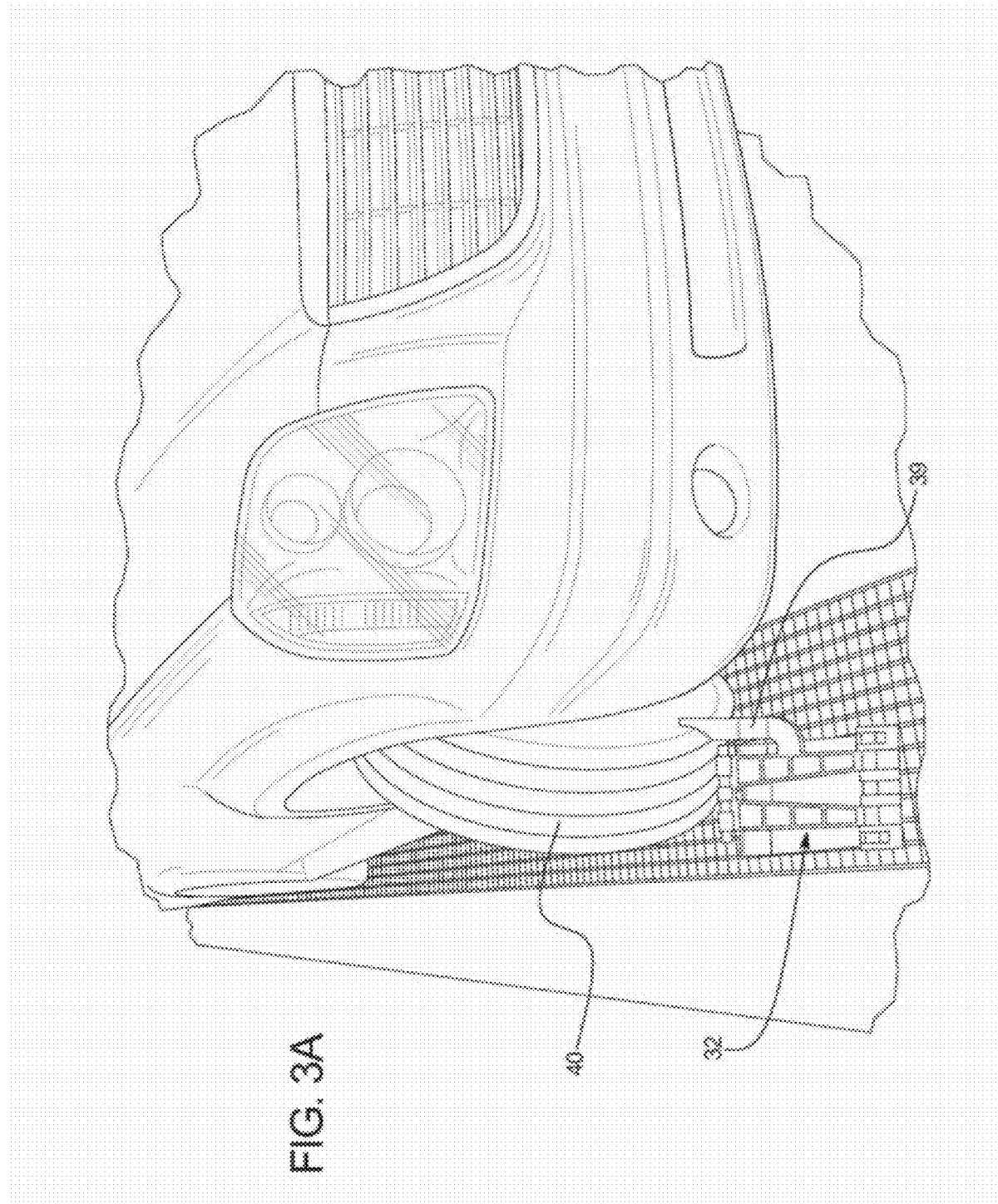
FIG. 3A is a perspective fragmentary view of a vehicle that has literally walked out of the prior art restraint illustrated in FIG. 2.
Figure 3B:
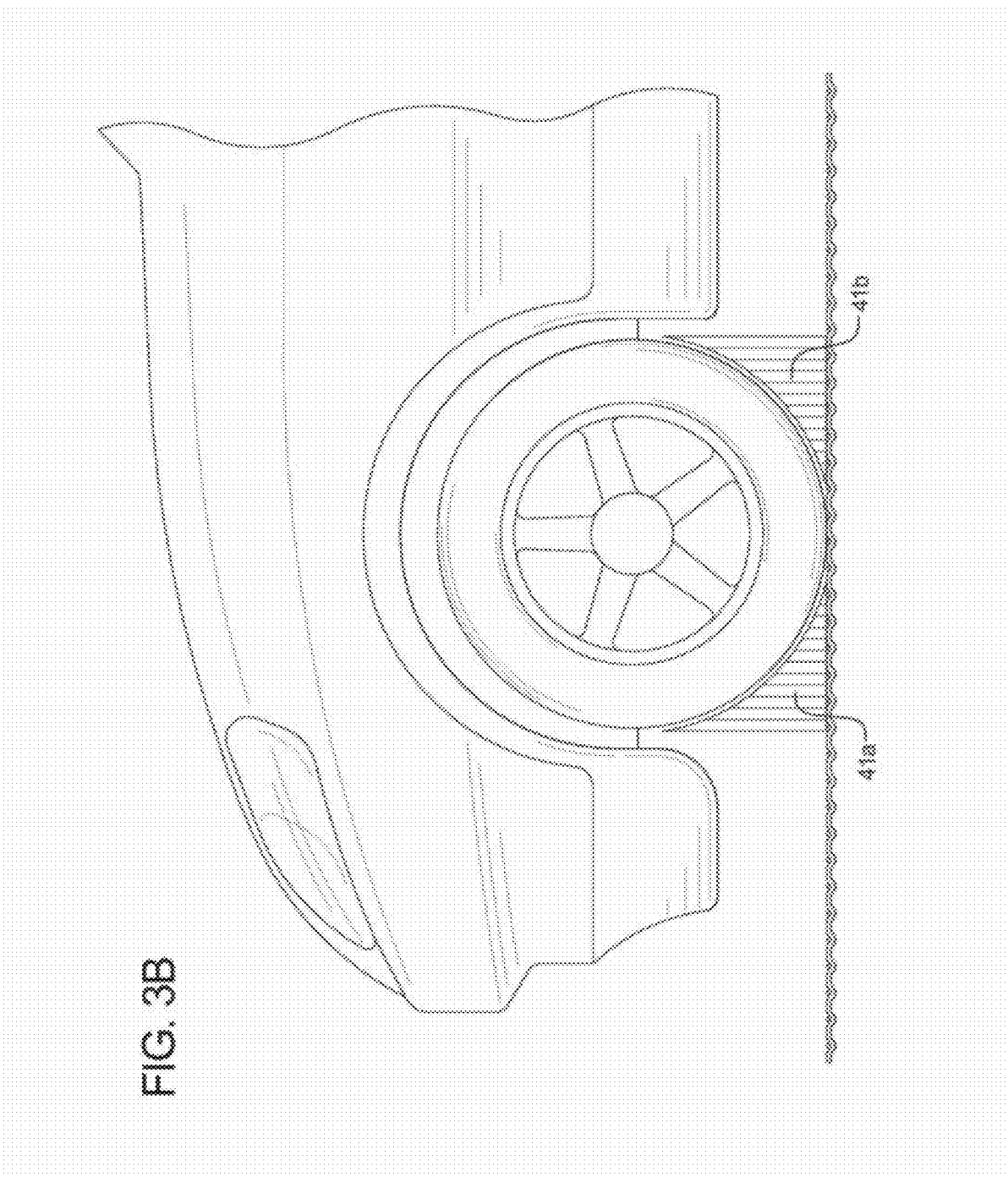
FIG. 3B is a fragmentary side view of a vehicle showing the safe zones around one of the tires of the vehicle.

Referring now to the drawings and particularly to FIG. 1, a typical auto-rack car 10 includes a frame 12 supported by trucks 14, each of which have several wheels 16 which roll along railroad tracks 18. The frame 12 supports two sidewalls 20 and a roof 22. The auto-rack car 10 includes a pair of co-acting clamshell doors 24 and 26 mounted on each end of the auto-rack car 10. The doors 24 and 26 are opened to facilitate the loading and unloading of vehicles into and out of the auto-rack car 10 and are closed during transport or storage of the vehicles.

The sidewalls 20 include a series of steel vertical posts 28 which are mounted on, and extend upwardly from, the frame 12. The roof 22 is mounted on, and supported by, these vertical posts. The vertical posts are evenly spaced along the entire length of both sidewalls 20 of the auto-rack car 10. A plurality of rectangular galvanized steel side wall panels 30 which extend horizontally and are vertically spaced apart are mounted between each pair of vertical posts 28. These side wall panels are supported at their corners by brackets (not shown) that are suitably secured to the vertical posts. The average side wall panel has a multiplicity of round sidewall panel holes 23. These side wall panel holes 23 provide the auto-rack car with natural light as well as proper ventilation. Proper ventilation prevents harm from the toxic vehicle fumes to the person or persons (i.e., loaders) loading or unloading the vehicles into or out of the auto-rack car.

The auto-rack car may be a tri-level car having first, second and third levels. Normally, eighteen passenger vehicles can be transported in a tri-level auto-rack car, six on each level. The auto-rack car can also have two levels for vehicles instead of three. The hi-level auto-rack car has a lower level and an upper level. The bi-level auto-rack car is generally used to transport larger vehicles, such as vans, mini-vans, pickup trucks, four-by-four and cross-over vehicles. The bi-level auto-rack car can usually transport twelve of these vehicles, six on each level. The auto-rack car may also be a single-level car.

The present disclosure provides an improved wheel chocking system for restraining road vehicles being transported on gratings disposed in transport containers such as this illustrated auto-rack railroad car 10. The improved vehicle wheel chocking system includes a plurality of improved vehicle wheel chocks. Each improved vehicle wheel chock is similar to the vehicle wheel chock disclosed in U.S. Pat. Nos. 5,312, 213 and 5,302,063, except that the chock includes an improved face-plate (as further described below) which dramatically improves the performance of the vehicle wheel chock disclosed in U.S. Pat. Nos. 5,312,213 and 5,302,063.

More specifically, FIGS. 4 to 10 illustrate one embodiment of the improved face-plate of the improved vehicle wheel chock of the present disclosure. In this illustrated embodiment, the improved face-plate 100 includes a body 102 and four spaced-apart arms 104, 106, 108, and 110 integrally connected to and extending from the body 102. The body 102 has a front side 112 and a back side 114. The configuration of the improved face-plate 100 is substantially different from the configuration of the improved face-plate disclosed in U.S. Pat. Nos. 5,312,213 and 5,302,063. FIG. 11 generally illustrates a comparison of the substantially different profiles of the improved face-plate 100 as compared to the face-plate disclosed in U.S. Pat. Nos. 5,312,213 and 5,302,063.

More specifically, in this illustrated embodiment, the improved face-plate 100 in approximately the same height and approximately the same width as the face-plate disclosed in U.S. Pat. Nos. 5,312,213 and 5,302,063; however, in this illustrated embodiment, certain portions of the improved face-plate 100 are substantially thicker than the face-plate disclosed in U.S. Pat. Nos. 5,312,213 and 5,302,063 as generally illustrated by the dimensions shown in FIG. 11.

The top portion of the improved face-plate 100 and specifically the upper portion of the body 102 and the arms 104, 106, 108, and 110 define an upper curvature on the upper front side of the improved face-plate for more precise and greater tire engagement. More specifically, the upper curvature is defined by the upper portion of the back wall of the body, the upper portion of the front wall of the body, the back walls of the arms, the front walls of the arms, and the top walls of the arms.

The bottom portion of the improved face-plate 100 and specifically the lower portion of the body 102 also defines a bottom curvature on the front side of the improved face-plate 100 for more precise and greater tire engagement. More specifically, the bottom curvature is defined by the bottom portion of the back wall of the body, the bottom portion of the front wall of the body, and the bottom wall of the body.

In one embodiment, the upper curvature and the lower curvature are approximately the same or approximately mirror images of each other. In one embodiment, the thickness of the central portion between the upper curvature and the lower curvature is approximately the same as the thickness of the face-plate disclosed in U.S. Pat. Nos. 5,312,213 and 5,302,06. In another embodiment, the thickness of the central portion between the upper curvature and the lower curvature is greater than the thickness of the face-plate disclosed in U.S. Pat. Nos. 5,312,213 and 5,302,06. In another embodiment, the thickness of the central portion between the upper curvature and the lower curvature is less than the thickness of the face-plate disclosed in U.S. Pat. Nos. 5,312,213 and 5,302,06. It should be appreciated that in various embodiments the upper curvature and the lower curvature form a radius in the front face of the face-plate 100 for enhanced engagement with a tire.

FIG. 11 shows the various thickness dimensions of one specific embodiment of the face-plate 100. It should be appreciated that the present disclosure is not limited to these exact dimensions.

In the illustrated embodiment, the front side of the improved face-plate 100 includes laterally spaced-apart outwardly and longitudinally extending reinforcing tire engaging members or ridges 150a, 150b, 150c, 150d, 152, 154, 156, and 158. These longitudinally extending ridges in combination with the upper and bottom curvatures of the improved face-plate provide enhanced engagement with and gripping of the tire. In the illustrated embodiment, each of the ridges are semi-circular, although it should be appreciated that one or more of the ridges can be other suitable shapes. It should also be appreciated that the ridges 150a, 150b, 150c, and 150d are spaced-apart respectively on the arms 104, 106, 108, and 110. The ridges co-act to better engage the tire and to create an under cut with the tire to reduce the likelihood that the vehicle with lift up or jump relative to the chock. More specifically, the improved face-plate 100 with the upper curvature, lower curvature, and ridges enable the tire to compress further into the improved face-plate and enables the improved chock to better restrain the vehicle from vertical lift. It should be appreciated that the ridges 150a, 152, 154, 156, and 158 are not taken in account in the dimensions shown in FIG. 11.

Figure 5:
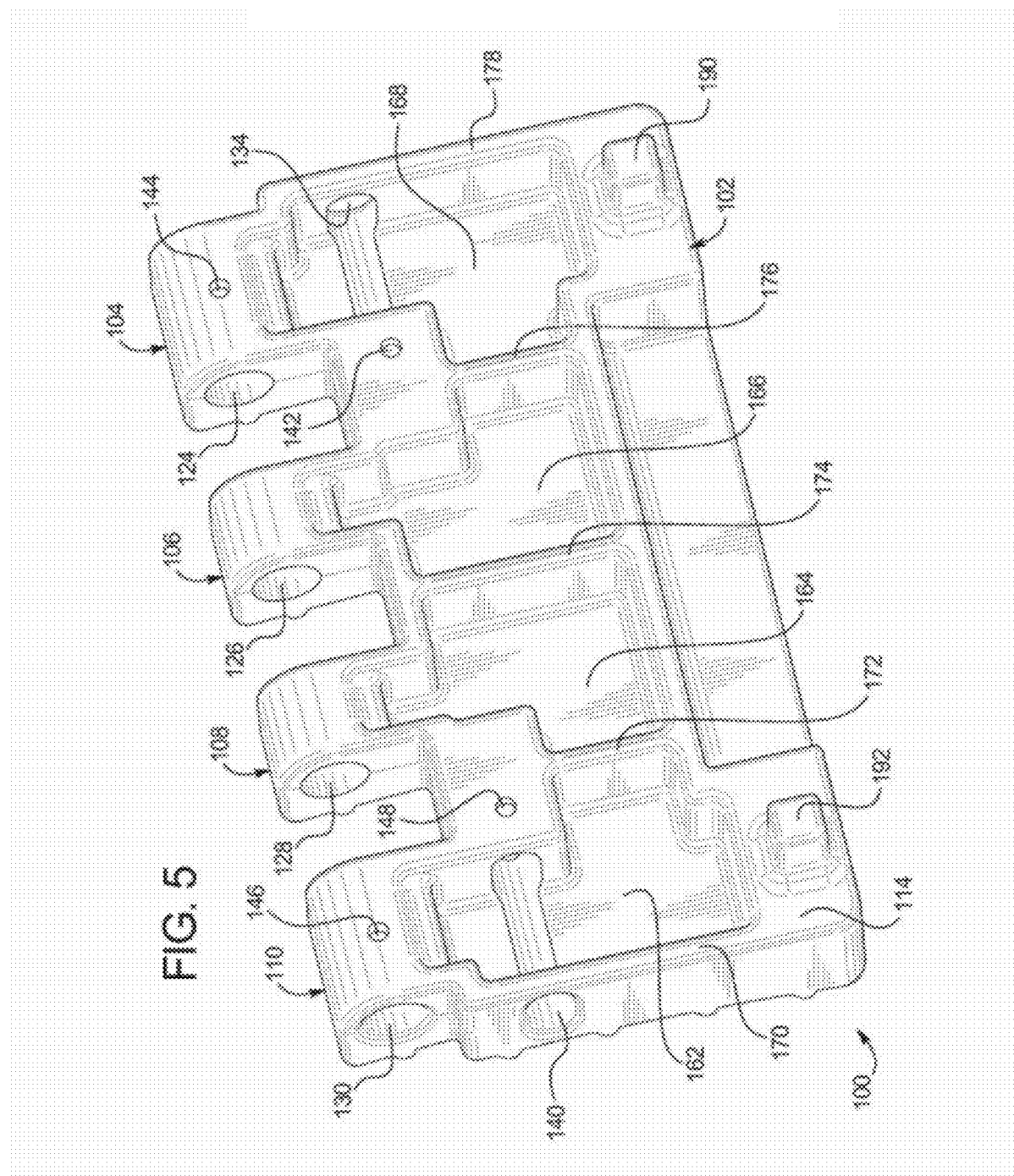
FIG. 5 is a rear perspective view of the improved face-plate of FIG. 4.
Figure 14:
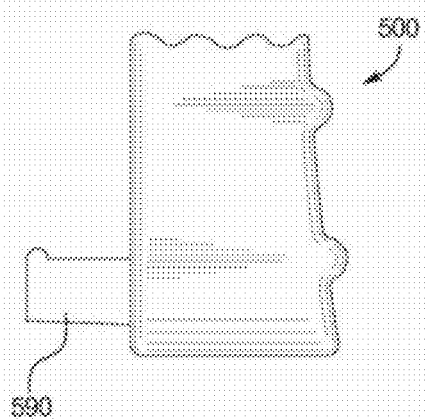
FIG. 14 is a fragmentary side view of an alternative embodiment of the improved face-plate of the present disclosure which includes an alternatively configured stud.
Figure 15:
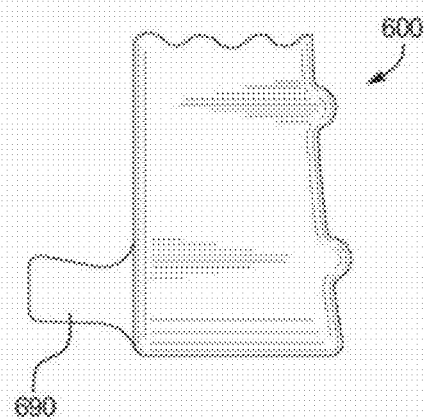
FIG. 15 is a fragmentary side view of a further alternative embodiment of the improved face-plate of the present disclosure which includes a further alternatively configured stud.
Figure 16:
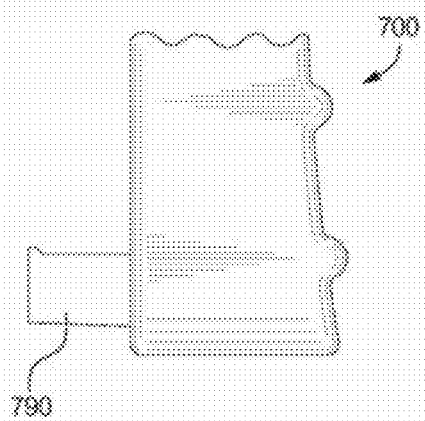
FIG. 16 is a fragmentary side view of a still further alternative embodiment of the improved face-plate of the present disclosure which includes a still further alternatively configured stud.
Figure 17:
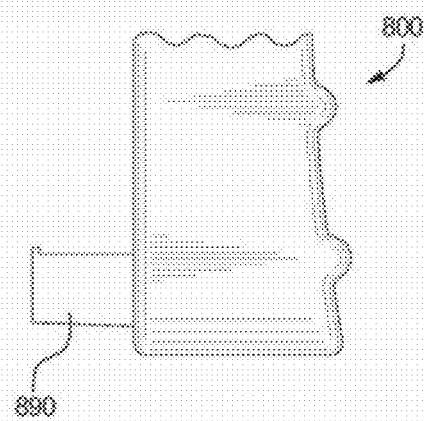
FIG. 17 is a fragmentary side view of a yet further alternative embodiment of the improved face-plate of the present disclosure which includes a yet further alternatively configured stud.
Figure 18:
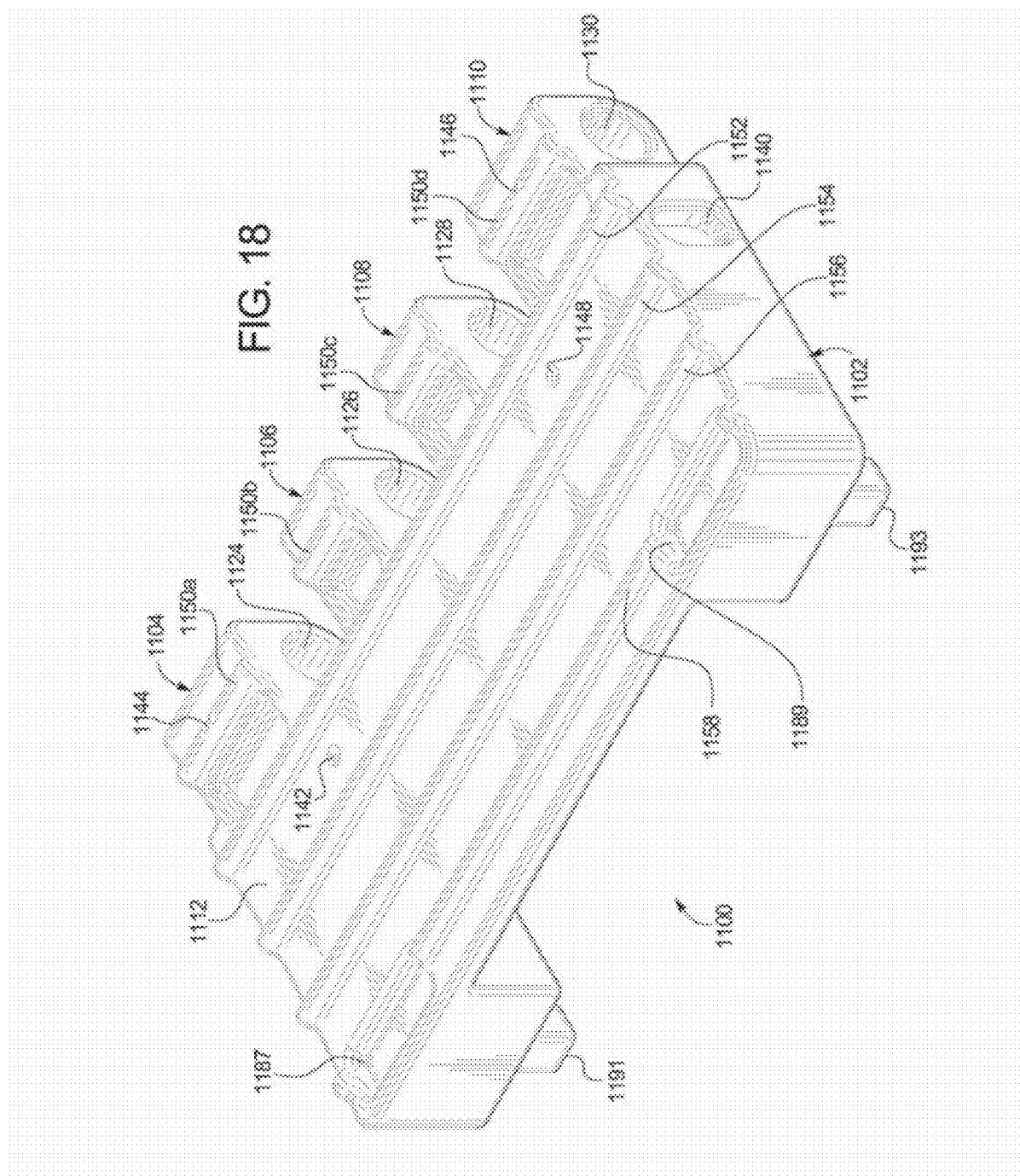
FIG. 18 is a front perspective view of another embodiment of the improved face-plate of the improved vehicle wheel chock of the present disclosure, the improved face-plate including spaced-apart engagement pins secured in the body of the improved face-plate.
Figure 19:
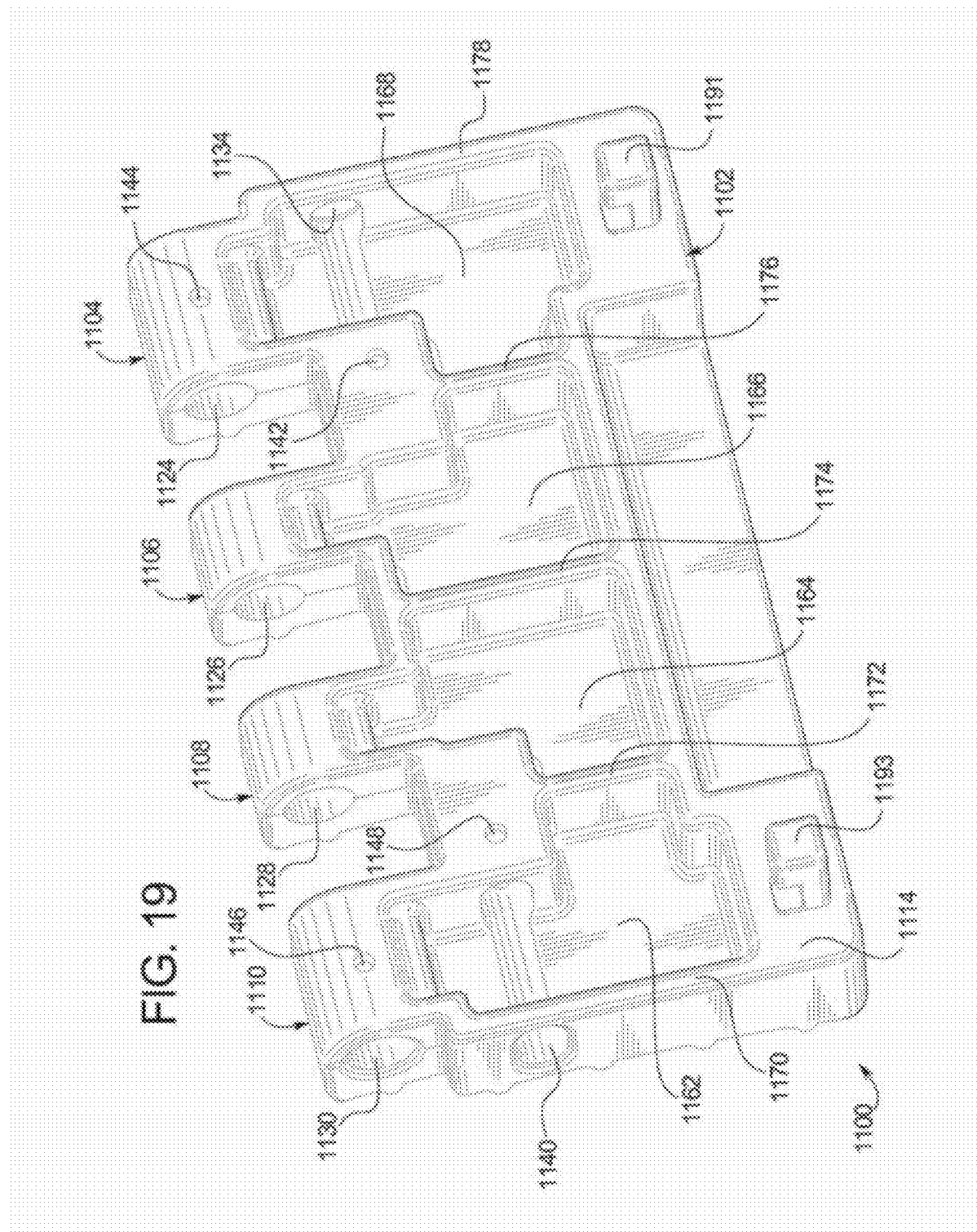
FIG. 19 is a rear perspective view of the improved face-plate of FIG. 18.
Figure 20:
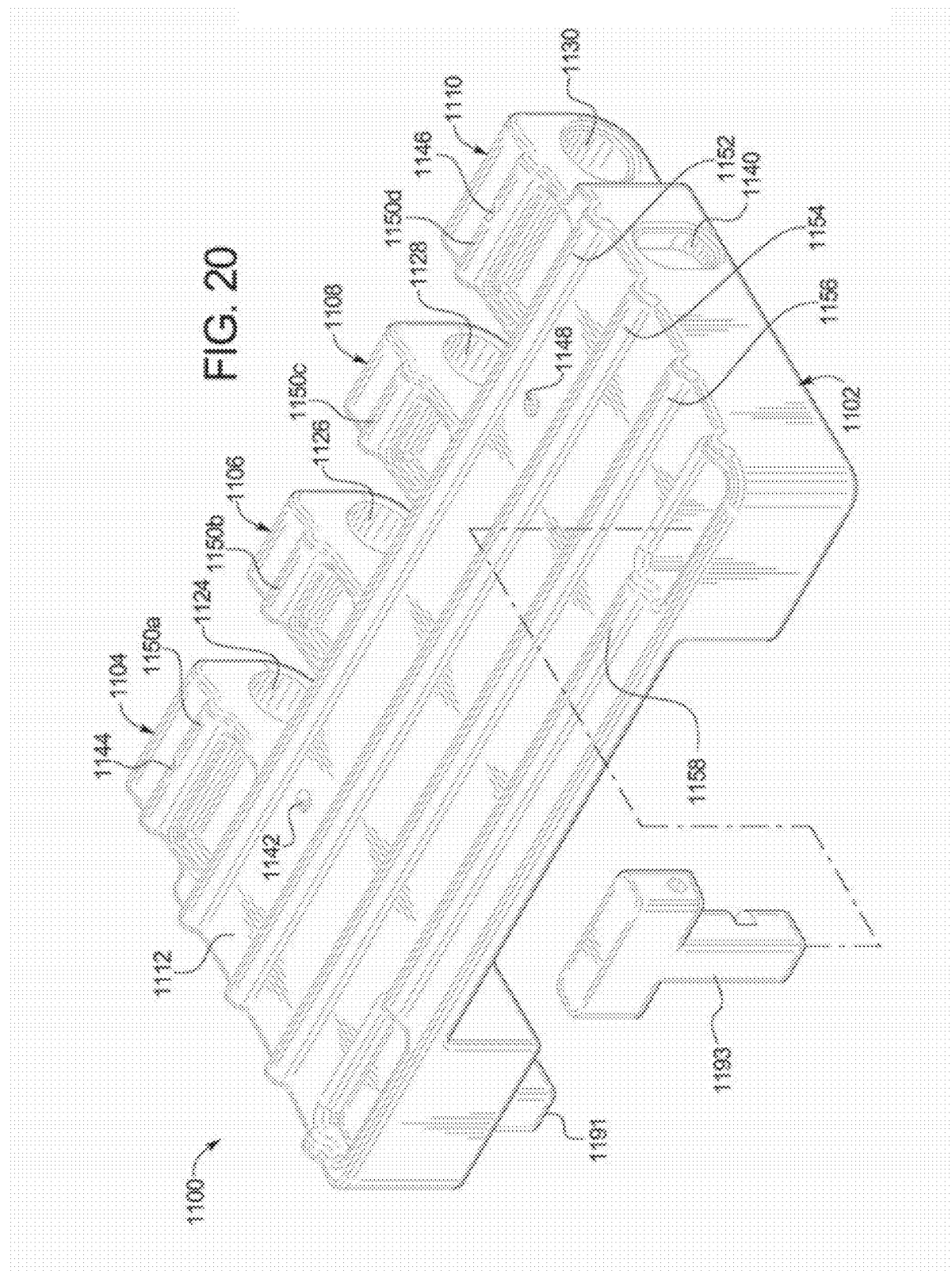
FIG. 20 is a front perspective view of the improved face-plate of FIG. 18, with one of the engagement pins shown removed from the body of the face-plate.
Figure 21:
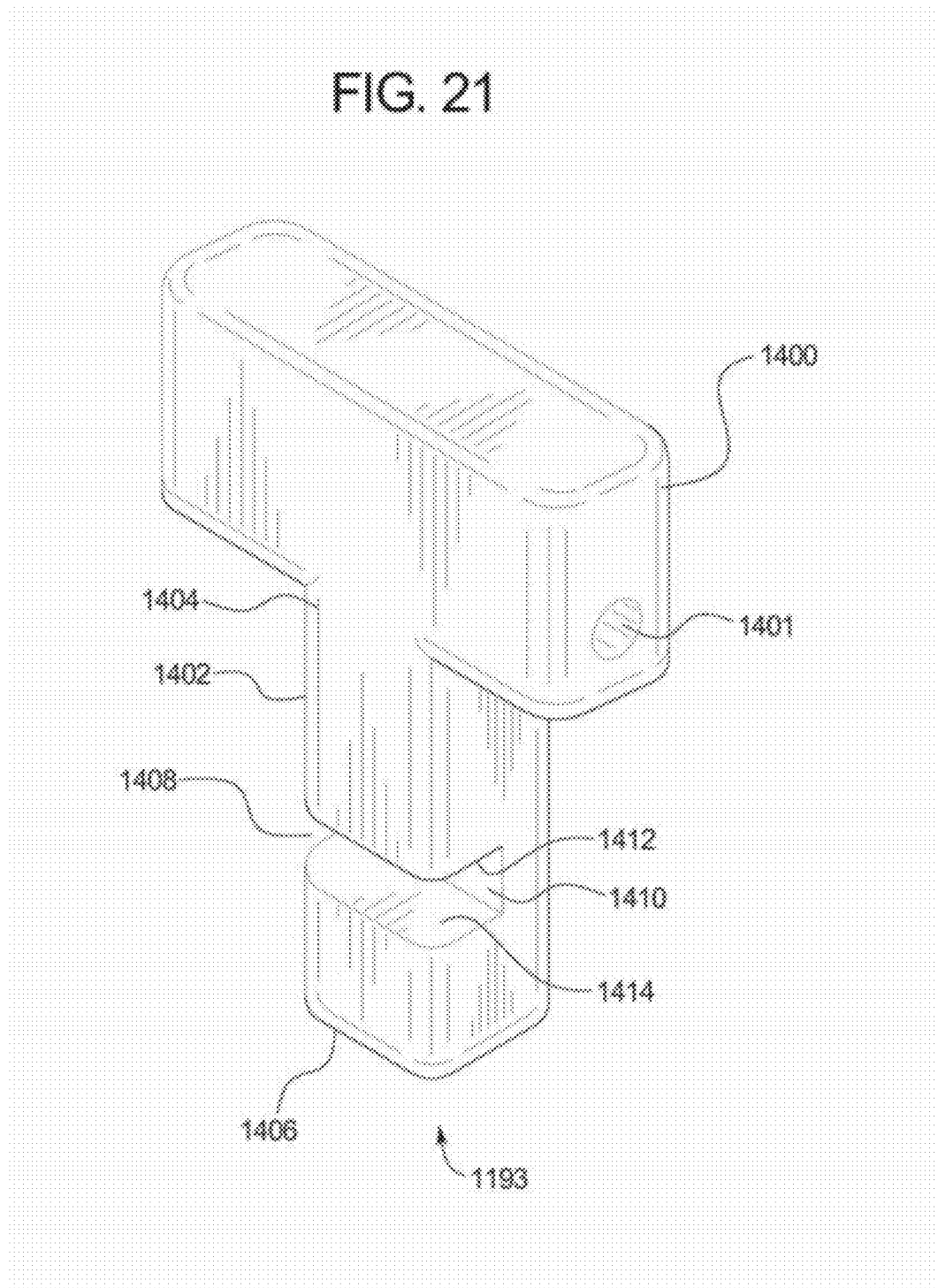
FIG. 21 is a perspective view of one embodiment of an engagement pin of the improved face-plate of FIG. 18.

In the illustrated embodiment, as best seen in FIGS. 5 and 6, the back side of the body 102 of the improved face-plate 100 respectively include indentations or slots 162, 164, 166, and 168 and reinforcing brackets, bars or ribs 170, 172, 174, 176, and 178 which provide structural rigidity to the body 102. It should be appreciated that this construction, in addition to providing structural rigidity for the face-plate, provides relief or cored-out areas for manufacture such as for the molding process.

In the illustrated embodiment of FIGS. 4 to 13, the improved face-plate 100 includes a pair of spaced apart non-hooking studs or legs 190 and 192 located near a bottom back edge of the improved face-plate and extending from the back side of the body 102 of the improved face-plate 100. The non-hooking studs or legs 190 and 192 project away from the body and are configured to engage a respective pair of a series of rectangular cavities in the front face of the front support member of the base of the chock as further discussed below. The non-hooking studs are configured to be respectively inserted into a respective pair of a series of rectangular cavities in the front face of the support member of the base of the chock without hooking onto the surfaces of the support member.

These free studs or legs 190 and 192 are of a substantially increased thickness when compared to the hooks described in U.S. Pat. Nos. 5,312,213 and 5,302,063. The hooks in these prior art patents are approximately 5/16 inch×1/2 inch. In this illustrated embodiment, the studs 190 and 192 are each approximately 1/2 inch×1/2 inch. In this illustrated embodiment, the base and the end of each side wall of each of the studs or legs 190 and 192 has a radius as opposed to the sharp edges of the hooks described in U.S. Pat. Nos. 5,312,213 and 5,302,063. FIG. 11 illustrates one embodiment of the studs and the radius of the bases of the studs. It should be appreciated that the present disclosure is not limited to studs each having bases or ends with such a radius.

These studs or legs 190 and 192 are made from the same strong material such as the entire face-plate as discussed below. However, it should be appreciated that the studs or legs could be made from other suitable materials. In this embodiment, the combination of the removal of the hooks, the increased thickness of the studs, the stronger material of the studs, and the configuration of the studs significantly improve the function of the face-plate.

It should be appreciated that in this embodiment, these studs or legs 190 and 190 do not include hooks or hooking members such as the hooks described in U.S. Pat. Nos. 5,312,213 and 5,302,063. U.S. Pat. Nos. 5,312,213 and 5,302,063 expressly explain that the hooks provide an important function in the dynamics of the control of the transported vehicle upon an impact. Specifically, U.S. Pat. Nos. 5,312,213 and 5,302,063 explain that when the chock is impacted by a vehicle, the vehicle tends to rise through frictional contact between the tire and the top of the face-plate, which causes pressure on the face-plate to rotate, and that the upward hooks maintain the face-plate in engagement.

The elimination of the hooks from the face-plate in certain embodiments, as taught by the present disclosure provides the specific advantage of easier adjustability and less hook failure or breakage. The elimination of these hooks and is directly contrary to the teachings of U.S. Pat. Nos. 5,312,213 and 5,302,063. However, it should be appreciated that as further disclosed below, the present disclosure is not limited to non-hooking studs.

It should also be appreciated that the illustrated embodiment of the improved face-plate of the present disclosure is a universal face-plate configured to be mounted on a left-hand chock or a right-hand chock. Specifically, as seen in FIGS. 4 to 11, the face-plate 100 includes: (a) openings 124 and 130 as described above which are each configured to receive the upper portion of a U-shaped hinge pin (not shown); (b) hinge pin slots 134 and 140 which are each configured to receive the lower portion of a U-shaped hinge pin (not shown); and (c) roll pin holes 142, 144, 146, and 148 which are each configured to received a roll pin (not shown) to securely engage the respective portion of the hinge pin (not shown). Thus, it should be appreciated that the face-plate of the present disclosure can receive the hinge pin on the right side or the left side. This allows a single face-plate to be used on right-hand chocks as well as on left-hand chocks. This facilitates easy replacement of new or broken face-plates (including in field repairs) and reduces the number of improved face-plates which need to be kept in inventory.

The improved face-plate 100 illustrated in FIGS. 4 to 11 is thus configured to be mounted on a vehicle wheel chock such as the vehicle wheel chock generally schematically illustrated in FIGS. 12 and 13, and which is further illustrated and described in much greater detail in U.S. Pat. Nos. 5,312,213 and 5,302,063 which are incorporated herein by reference at least for their teaching of the chock components. The improved vehicle wheel chock is generally indicated by numeral 200. The improved chock 200 is configured to be attached to a grating or wire grid 300 which has parallel spaced-apart steel wires crossing and welded to parallel spaced-apart steel wires as also illustrated in more detail in U.S. Pat. Nos. 5,312,213 and 5,302,063. The improved chock 200 is configured to position and hold the improved face-plate 100 in different positions or heights to account for different size vehicles and tires as somewhat illustrated in FIGS. 12 and 13. The improved chock 200 is configured to be positioned adjacent to a tire 320 of a wheel 322 of a vehicle such as the vehicle 330 partially shown in FIGS. 12 and 13. The improved chock 200 is configured to be attached to the grating or wire grid 300 adjacent to the tire 320 such that the improved face-plate 100 engages the outer surface of the tread of the tire as best shown in FIG. 13.

The improved chock generally includes: (a) a base 202 having a plurality of studs configured to fit into openings in the grating 300; (b) a locking assembly 204 configured to releaseably secure the chock 200 to the grating 300; (c) a lateral restrainer such as a paddle-shaped member 206 located on the left or right side of the improved chock 200 and configured to restrain lateral displacement and lateral shifting of the vehicle; (d) a series of clamping teeth or grate engagers 208 along the front portion of the base 202 configured to grip the grating 300; and (e) a load transferor 210 pivotally attached to the back end of the base 202. The base 202 includes a forward support member 212 angled away from the wheel. The improved chock disclosed herein also includes the improved face-plate 100 secured to the top end of the load transferor by a hinge pin (not shown) and spring biased inwardly by a torsion spring assembly (not shown). Specifically, the upper portion of the hinge pin extends through openings 124, 126, 128, and 130 respectively in arms 104, 106, 108, and 110.

The improved chock 200 is used by positioning the improved chock 200 on the grating or wire grid 300 adjacent a tire 320 and then hooking the front grate engagers 208 onto the cross wires while the locking assembly 204 is in the unlocked position. The locking assembly is then moved into the locked position, such that the improved chock 200 is secured to the grating.

The improved face-plate 100 which is attached to the load transferor can be positioned at three distinct vertical positions and movably retained along the angled plane of the support member 212. The improved face-plate 100 when attached to the load transferor is spring biased inwardly by a torsion spring assembly as described in detail in U.S. Pat. Nos. 5,312,213 and 5,302,063. The improved face-plate 100 thus can be positioned to abut the tire tread of the wheel at one of three different heights relative to the wheel diameter. In the lower and intermediate positions, the improved chock keeps the improved face-plate close to the tire and away from the fenders, body panels and trim of the vehicle.

The improved face-plate 100 is substantially better suited to distribute the forces from the tire (and vehicle) over a greater surface area than the face-plate described in U.S. Pat. Nos. 5,312,213 and 5,302,063.

In one embodiment, the improved face-plate of the present disclosure is molded of a liquid thermoset plastics material primarily composed of a plural component liquid monomer mixture which can be molded by a reaction injection molding (RIM) process. An example of such a product is produced by Metton America Corporation and sold under the trademark METTON. The improved face-plate can alternatively be made from other suitable materials such as nylon, a glass filled nylon, a Dicyclopentadiene, an Acrylonitrile-butadine-styrene, or a polycarbonate. It should further be appreciated that the improved face-plate could be made from any one or more suitable materials, including other metals, plastics, ceramics and composite materials or combinations thereof.

As mentioned above, it should be appreciated that the present disclosure is not limited to non-hooking studs. In alternative embodiments, the studs include hooks or other engagement members or configurations. For example, FIGS. 14, 15, 16, and 17 generally show alternative face-plates 500, 600, 700, and 800 with respectively, with alternative stud configurations or studs 590, 690, 790, and 890 respectively.

It should be appreciated that the present disclosure thus provides in various embodiments: a vehicle wheel chock for a vehicle on a grating including: (a) a base having a plurality of studs configured to fit into openings in the grating; (b) a load transferor pivotally connected to a rear end of the base; (c) a plurality of front clamping teeth attached to a front end of the base; (d) a locking assembly configured to co-act with the front clamping teeth to secure the base to the grating; (e) a lateral restrainer configured to restrain lateral displacement and lateral shifting of the vehicle relative to the grating; and (f) a face-plate attached to the load transferor by a hinge pin and roll pins. The face-plate includes: (i) a body having a front side and a back side, (ii) a plurality of spaced-apart arms connected to and extending from the body, (iii) an upper portion of the body and the arms defining an upper curvature on an upper front side of the face-plate, said upper curvature defined by the upper portion of the back walls of the body, the upper portion of the front walls of the body, the back walls of the arms, the front walls of the arms, and the top walls of the arms, (iv) a lower portion of the body defining a bottom curvature on the front side of the face-plate, the bottom curvature defined by the bottom portion of the back walls of the body, the bottom portion of the front walls of the body, and the bottom walls of the body, (v) a plurality of laterally spaced apart outwardly and longitudinally extending reinforcing tire engaging ridges, and (vi) a pair of spaced apart studs connected to and extending from the back side of the bottom of the body and configured to engage a respective pair of a series of rectangular cavities in a front face of the load transfer member.

It should be appreciated that the improved face-plate of the present disclosure can be place on a new chock or can be used to replace a face-plate on an existing chock such as that the chock described in U.S. Pat. Nos. 5,312,213 and 5,302,063. More specifically, the improved face-plate easily and quickly can replace the existing face-plate on the chock described in U.S. Pat. Nos. 5,312,213 and 5,302,063 by: (a) removing the two roll pins which retain the U-shaped hinge pin, (b) removing the hinge pin, (c) removing the old face-plate, (d) placing the improved face-plate in the position of the old face-plate, (e) reinserting the hinge pin, and (f) reattaching the two roll pins.

It should be appreciated that the improved face-plate in certain embodiments is configured to break upon a designed amount of pressure or force placed on the face-plate by a tire. This construction prevents damage to the suspension of the vehicle which is difficult to detect. More specifically, in severe impact situations, if the chock (or a portion of the chock) does not break upon impact by the tire, the impact can be absorbed by one or more of the components of the suspension system of the vehicle, which can cause damage to those components. Such damage cannot be easily detected from outside manual inspection of the vehicle. In such cases, where the detection does not occur, the vehicle can be sold in a damaged state and can lead to later problems with the purchasers. Thus, in severe impact situations, vehicle manufacturers desire the chock to give or break, which may cause damage to the exterior components of the vehicle (i.e., bumpers, fenders, etc.). In such situations, such damage can be readily detected and the vehicles can be fixed prior to sale of the vehicle. Additionally, when an unloader sees damaged chocks, the unloader will know that the vehicle must be carefully inspected for damage. If there is any damage, the costs for the related repairs of the vehicles can be borne by the appropriate party according to the transportation agreements. The construction disclosed herein of the chock also facilitates easy and cost efficient reconstruction of such broken chocks.

A further alternative embodiment of the improved face-plate of the present disclosure is shown in FIGS. 18, 19, 20, 21, 22, 23A, and 23B. Similar to the above embodiments, in this illustrated embodiment, this face-plate 1100 includes: (a) a body 1102 having a front side 1112 and a back side 1114a; and (b) four spaced-apart arms 1104, 1106, 1108, and 1110 integrally connected to and extending from the body 1102. The back side of the body 1102 of the face-plate 1100 respectively includes indentations or slots 1162, 1164, 1166, and 1168 and reinforcing brackets, bars or ribs 1170, 1172, 1174, 1176, and 1178 which provide structural rigidity to the body 1102. As with the above described embodiments, this configuration provides structural rigidity for the face-plate 1100 and provides relief or cored-out areas for manufacture such as for the molding process.

As with the above described embodiments, this illustrated embodiment of the face-plate is universal in that it is configured to be mounted on a left-hand chock or on a right-hand chock. Specifically, as seen in FIGS. 18, 19, 20, and 22, the face-plate 1100 includes: (a) openings 1124, 1126, 1128, and 1130 which are each configured to receive the upper portion of a U-shaped hinge pin (not shown); (b) hinge pin slots 1134 and 1140 which are each configured to receive the lower portion of the U-shaped hinge pin (not shown); and (c) roll pin holes 1142, 1144, 1146, and 1148 which are each configured to receive a roll pin (not shown) to securely engage the respective portion of the hinge pin (not shown). Thus, it should be appreciated that this face-plate 1100 can receive the hinge pin (not shown) on the right side or the left side. This enables this face-plate 1100 to be used on right-hand chocks as well as on left-hand chocks. This facilitates easy replacement of new or broken face-plates (including in field repairs) and reduces the number of face-plates which need to be kept in inventory.

The top portion of the face-plate 1100 and specifically the upper portion of the body 1102 and the arms 1104, 1106, 1108, and 1110 define an upper curvature on the upper front side of the face-plate for more precise and greater tire engagement (as with the above described embodiments). The upper curvature is defined by the upper portion of the back wall of the body, the upper portion of the front wall of the body, the back walls of the arms, the front walls of the arms, and the top walls of the arms. The bottom portion of the face-plate 1100 and specifically the lower portion of the body 1102 also defines a bottom curvature on the front side of the face-plate 1100 for more precise and greater tire engagement (as with the above described embodiments). The bottom curvature is defined by the bottom portion of the back wall of the body, the bottom portion of the front wall of the body, and the bottom wall of the body. In this illustrated embodiment: (a) the upper curvature and the lower curvature are approximately the same or approximately mirror images of each other; (b) the thickness of the central portion between the upper curvature and the lower curvature is approximately the same as the thickness of the face-plate disclosed in U.S. Pat. Nos. 5,312,213 and 5,302,06; and (c) the upper curvature and the lower curvature form a radius in the front face of the face-plate 1100 for enhanced engagement with a tire.

Similar to the above described embodiments, in this illustrated embodiment, the front side of the face-plate 1100 includes laterally spaced-apart outwardly and longitudinally extending reinforcing tire engaging members or ridges 1150*a*, 1150*b*, 1150*c*, 1150*d*, 1152, 1154, 1156, and 1158. These longitudinally extending ridges in combination with the upper and bottom curvatures of the face-plate 1100 provide enhanced engagement with and gripping of the tire. In this illustrated embodiment, each of the ridges are semicircular, although it should be appreciated that one or more of the ridges can be other suitable shapes. It should also be appreciated that the ridges 1150*a*, 1150*b*, 1150*c*, and 1150*d* are spaced-apart respectively on the arms 1104, 1106, 1108, and 1110. As described in relation to the above embodiments: (a) the ridges co-act to better engage the tire and to create an under cut with the tire to reduce the likelihood that the vehicle with lift up or jump relative to the chock; and (b) the face-plate with the upper curvature, lower curvature, and ridges enables the tire to compress further into the face-plate and enables the improved chock with this face-plate to better restrain the vehicle from vertical lift.

In this embodiment, the face-plate 1100 (except for the engagement pins as discussed below) is molded of a liquid thermoset plastics material primarily composed of a plural component liquid monomer mixture which can be molded by a reaction injection molding (RIM) process. An example of such a product is produced by Melton America Corporation and sold under the trademark METTON. This face-plate 1100 (except for the engagement pins) can alternatively be made from other suitable materials such as nylon, a glass filled nylon, a Dicyclopentadiene, an Acrylonitrile-butadiene-styrene, or a polycarbonate. It should further be appreciated that this face-plate 1100 (except for the engagement pins) could be made from any one or more suitable materials, including other metals, plastics, ceramics and composite materials or combinations thereof.

In this illustrated embodiment, the bottom section of the body 1102 of the face-plate 1100 includes a pair of spaced apart pin receiving apertures 1187 and 1189 configured to respectively receive engagement pins 1191 and 1193. The engagement pins 1191 and 1193 are configured to extend out of the back side of the body 1102 of the face-plate 1100 as best shown in FIGS. 19, 22, 23A and 23B. The engagement pins 1191 and 1193 project away from the back side 1114 of the body and are configured to engage any one of the three sets of rectangular cavities in the front face of the front support member of the base of the chock as further discussed below. These engagement pins 1191 and 1193 are made from a substantially stronger than the molded in hooks described in U.S. Pat. Nos. 5,312,213 and 5,302,063. These engagement pins 1191 and 1193 are made from a suitably strong material such as stainless steel. It should be appreciated that the engagement pins could be made from other suitably strong materials besides stainless steel. The engagement pins 1191 and 1193 are of a substantially different configuration than and function differently than the hooks described in those patents, and provide substantially better engagement with the forward support member of the chock as further described below. The addition of these engagement pins significantly improve the function of the face-plate and the chock as further described below.

In this illustrated embodiment, the engagement pins 1191 and 1193 are identical, and thus engagement pin 1193 will be described in more detail below as an example of the engagement pins. However, it should be appreciated that the engagement pins do not have to be identical in accordance with the present invention. Engagement pin 1193, as best shown in FIGS. 20, 21, 23A, and 23B, includes a mounting head 1400 and an engagement leg 1402 integrally connected to and extending from the mounting head 1400. The mounting head 1400 is configured to be positioned in the aperture in the body 1102 of the face-plate 1100 (as best shown in FIG. 22) and to be secured by one or more fastening mechanisms or attachment members such as roll pins (such as pin 1403 in FIG. 22). The mounting head 1400 accordingly includes one or more pin receipt holes (such as hole 1401) configured to receive the attachment members. It should be appreciated that the mounting head 1400 can be secured in the body in any suitable manner. It should also be appreciated that the mounting head can be configured differently for secure attachment in and to the body 1102 of the face-plate 1100. The engagement leg 1402 includes an attachment end 1404 attached to the mounting head 1400 and an opposite free end 1406. The engagement leg 1402 further defines an engagement slot 1408 in the upper surface of the engagement leg 1402 between the attachment end 1404 and the opposite free end 1406; and more specifically includes a bottom engagement wall 1410, an inner engagement wall 1412, and an outer engagement wall 1414 which define the engagement slot 1408. These walls of the engagement slot 1408 are configured to better engage the forward support member of the chock as further described below and as illustrated in FIGS. 23A and 23B. It should be appreciated that after the engagement pins are placed in the body of the face plate, suitable caps (not shown) may be placed in the front portions of the apertures.

As with the above embodiments, the face-plate 1100 is configured to be mounted on a vehicle wheel chock such as the vehicle wheel chock generally partially schematically illustrated in FIGS. 23A and 23B, and which is further illustrated and described in much greater detail in U.S. Pat. Nos. 5,312,213 and 5,302,063. In FIGS. 23A and 23B, this example vehicle wheel chock is generally indicated by numeral 1200. The chock 1200 is configured to be attached to a grating or wire grid 300 which has parallel spaced-apart steel wires crossing and welded to parallel spaced-apart steel wires as also illustrated in more detail in U.S. Pat. Nos. 5,312,213 and 5,302,063. The chock 1200 is configured to position and hold the face-plate 1100 in different positions or heights to account for different size vehicles and tires as somewhat illustrated in FIGS. 23A and 23B. The chock 1200 is configured to be positioned adjacent to a tire 320 of a wheel of a vehicle (not shown). The chock 1200 is configured to be attached to the grating or wire grid 300 adjacent to the tire 320 such that the face-plate 1100 engages the outer surface of the tread of the tire 320.

The chock 1200 with this face-plate 1100 thus generally includes: (a) a base 1212 having a plurality of studs (not shown) configured to fit into openings in the grating; (b) a locking assembly (not shown) configured to releaseably secure the chock to the grating; (c) a lateral restrainer (not shown) such as a paddle-shaped member located on the left or right side of the improved chock and configured to restrain lateral displacement and lateral shifting of the vehicle: (d) a series of clamping teeth or grate engagers 1219 along the front portion of the base configured to grip the grating; and (e) a load transferor 1210 pivotally attached to the back end of the base 1212. The base 1212 includes a forward support member 1212a angled away from the wheel. This chock 1200 also includes the face-plate 1100 secured to the top end of the load transferor 1210 by a hinge pin (not shown) and spring biased inwardly by a torsion spring assembly (not shown). Specifically, the upper portion of the hinge pin (not shown) extends through openings 1124, 1126, 1128, and 1130 respectively in arms 1104, 1106, 1108, and 1110 as described above. As with the above described embodiments, this chock is used by positioning the chock on the grating or wire grid adjacent a tire and then hooking the front grate engagers onto the cross wires while the locking assembly is in the unlocked position. The locking assembly is then moved into the locked position, such that the chock is secured to the grating.

As illustrated in FIGS. 23A and 23B, when the chock 1200 with the face-plate 1100 is impacted by a vehicle, the vehicle tends to rise through frictional contact between the tire and the top of the face-plate 1100, which causes pressure on the face-plate to rotate upwardly and causes the engagement pins 1191 and 1193 to engage and lock onto the forward support member 1212a as shown in FIG. 23B. More specifically, in resting position shown in FIG. 23A, the engagement pin is positioned in the cavity or hole 1213 defined by the forward support member 1212a of the base 1212, but does not actively engage the portion of the forward support member above the engagement slot 1408. When a tire causes the face-plate 1100 to rotate, the engagement pin 1191 moves upwardly and outwardly (i.e., toward the tire) as shown in FIG. 23B to engage that portion of the forward support member 1212a to prevent further rotation of the face-plate 1100. This provides a more secure engagement with the forward support member 1212a and better overall engagement with tire 320, which in turn enables the chock with this face plate to withstand substantially greater impact forces from the tire without breaking and while still restraining the vehicle.

It should be appreciated that the face-plate 1100 which is attached to the load transferor 1210 can be positioned at three distinct vertical positions and movably retained along the angled plane of the forward support member 1212a. The face-plate 1100, when attached to the load transferor, is spring biased inwardly by a torsion spring assembly (as described in detail in U.S. Pat. Nos. 5,312,213 and 5,302,063). The face-plate 1100 thus can be positioned to abut the tire tread of the wheel at one of three different heights relative to the wheel diameter where the engagement pins are disposed in the respective set of cavities or holes, (1211, 1213, or 1215) in the member 1212a. The face-plate 1100 is thus substantially better suited to distribute the forces from the tire (and vehicle) over a greater surface area than the face-plate described in U.S. Pat. Nos. 5,312,213 and 5,302,063.

Figure 26:
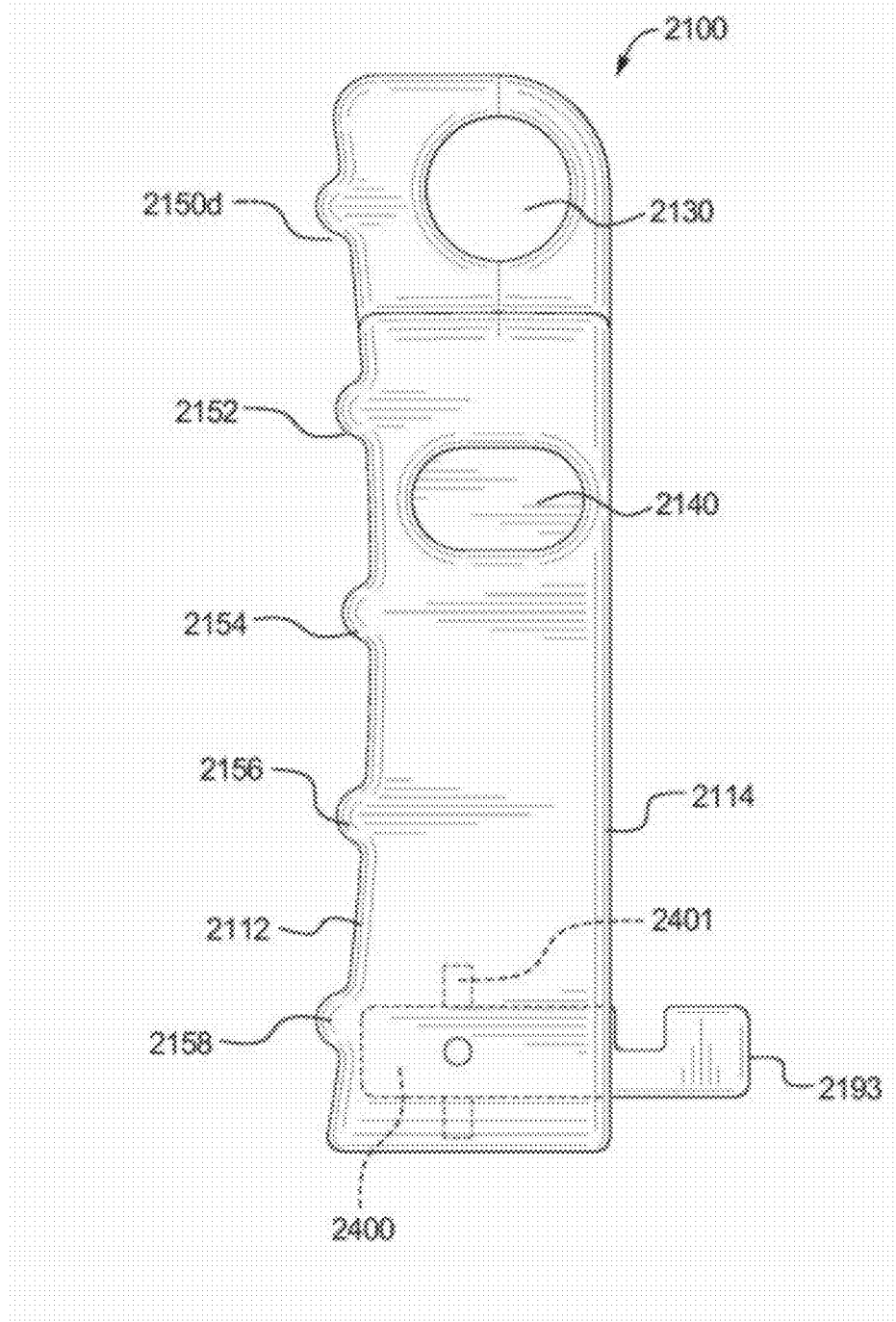
FIG. 26 is a cross-sectional view of the improved face-plate of FIG. 24, illustrating the position of one of the engagement pins.

Another alternative embodiment of the improved face-plate of the present disclosure is shown in FIGS. 24, 25, and 26. Similar to the above embodiments, in this illustrated embodiment, this face-plate 2100 includes: (a) a body 2102 having a front side 2112 and a back side 2114a; and (b) four spaced-apart arms 2104, 2106, 2108, and 2110 integrally connected to and extending from the body 2102. The back side of the body 2102 of the face-plate 2100 respectively includes indentations or slots 2162, 2164, 2166, and 2168 and reinforcing brackets, bars or ribs 2170, 2172, 2174, 2176, and 2178 which provide structural rigidity to the body 2102. As with the above described embodiments, this configuration provides structural rigidity for the face-plate 2100 and provides relief or cored-out areas for manufacture such as for the molding process.

As with the above described embodiments, this illustrated embodiment of the face-plate is universal in that it is configured to be mounted on a left-hand chock or on a right-hand chock. The face-plate 2100 includes: (a) openings 2124, 2126, 2128, and 2130 which are each configured to receive the upper portion of a U-shaped hinge pin (not shown); (b) hinge pin slots 2134 and 2140 which are each configured to receive the lower portion of the U-shaped hinge pin (not shown); and (c) roll pin holes 2142, 2144, 2146, and 2148 which are each configured to receive a roll pin (not shown) to securely engage the respective portion of the hinge pin (not shown). Thus, it should be appreciated that this face-plate 2100 can receive the hinge pin (not shown) on the right side or the left side. This enables this face-plate 2100 to be used on right-hand chocks as well as on left-hand chocks. This facilitates easy replacement of new or broken face-plates (including in field repairs) and reduces the number of face-plates which need to be kept in inventory.

The top portion of the face-plate 2100 and specifically the upper portion of the body 2102 and the arms 2104, 2106, 2108, and 2110 define an upper curvature on the upper front side of the face-plate for more precise and greater tire engagement (as with the above described embodiments). The upper curvature is defined by the upper portion of the back wall of the body, the upper portion of the front wall of the body, the back walls of the arms, the front walls of the arms, and the top walls of the arms. The bottom portion of the face-plate 2100 and specifically the lower portion of the body 2102 also defines a bottom curvature on the front side of the face-plate 2100 for more precise and greater tire engagement (as with the above described embodiments). The bottom curvature is defined by the bottom portion of the back wall of the body, the bottom portion of the front wall of the body, and the bottom wall of the body. In this illustrated embodiment: (a) the upper curvature and the lower curvature are approximately the same or approximately mirror images of each other; (b) the thickness of the central portion between the upper curvature and the lower curvature is approximately the same as the thickness of the face-plate disclosed in U.S. Pat. Nos. 5,312,213 and 5,302,06; and (c) the upper curvature and the lower curvature form a radius in the front face of the face-plate 2100 for enhanced engagement with a tire.

Similar to the above described embodiments, in this illustrated embodiment, the front side of the face-plate 2100 includes laterally spaced-apart outwardly and longitudinally extending reinforcing tire engaging members or ridges 2150a, 2150b, 2150c, 2150d, 2152, 2154, 2156, and 2158. It should be appreciated that in this embodiment, ridge 2158 extends along the entire width of face-plate 2100. These longitudinally extending ridges in combination with the upper and bottom curvatures of the face-plate 2100 provide enhanced engagement with and gripping of the tire. In this illustrated embodiment, each of the ridges are semi-circular, although it should be appreciated that one or more of the ridges can be other suitable shapes. It should also be appreciated that the ridges 2150a, 2150b, 2150c, and 2150d are spaced-apart respectively on the arms 2104, 2106, 2108, and 2110. As described in relation to the above embodiments: (a) the ridges co-act to better engage the tire and to create an under cut with the tire to reduce the likelihood that the vehicle with lift up or jump relative to the chock; and (b) the face-plate with the upper curvature, lower curvature, and ridges enables the tire to compress further into the face-plate and enables the improved chock with this face-plate to better restrain the vehicle from vertical lift.

In this illustrated embodiment, the face-plate 2100 is molded of a liquid thermoset plastics material primarily composed of a plural component liquid monomer mixture which can be molded by a reaction injection molding (RIM) process and the engagement pins are placed in the mold for the molding process. An example of such a product is produced by Metton America Corporation and sold under the trademark METTON. This face-plate 2100 (except for the engagement pins) can alternatively be made from other suitable materials such as nylon, a glass filled nylon, a Dicyclopentadiene, an Acrylonitrile-butadiene-styrene, or a polycarbonate. It should further be appreciated that this face-plate 2100 (except for the engagement pins) could be made from any one or more suitable materials, including other metals, plastics, ceramics and composite materials or combinations thereof.

In this illustrated embodiment, the pair of spaced apart engagement pins 2191 and 2193 are located at spaced apart positions at the bottom of the face-plate 2100 and extend from the back side 2114 of the body 2102 of the face-plate 2100 as best shown in FIGS. 25 and 26. The engagement pins 2191 and 2193 project away from the back of the body and are configured to engage a respective pair of a series of rectangular cavities in the front face of the front support member of the base of the chock as discussed above. These engagement pins 2191 and 2193 are configured to be attached to the body when the body is formed or molded. In this illustrated embodiment, the mounting head 2400 of the engagement pin is shown with a different configuration than the engagement pins 1191 and 1193. As illustrated in phantom in FIG. 26, this head 2400 includes a transversely expending securement member 2401 which assists in securing the molded in engagement pin 2193 in the body of the of the face-plate 2100. It should be appreciated that the shape of the mounting head can be any suitable shape which will facilitate the secure molding of the engagement pin in the body. In this illustrated embodiment, these engagement pins 2191 and 2193 are made from a suitably strong material such as stainless steel. It should be appreciated that the engagement pins could be made from other suitably strong materials besides stainless steel. Except for how these engagement pins 2191 and 2193 are molded into the body of the face-plate, they function identical to the engagement pins 1191 and 1193 described above.

It will be understood that modifications and variations may be effected without departing from the scope of the novel concepts of the present invention, and it is understood that this application is to be limited only by the scope of the claims.

The invention is claimed as follows:

1. A vehicle wheel chock for a vehicle on a grating, said vehicle wheel chock comprising:
   a base having a plurality of studs configured to fit into openings in the grating, said base including a forward support member;
   a load transferor pivotally connected to a rear end of the base;
   a plurality of front clamping teeth attached to a front end of the base;
   a locking assembly configured to co-act with the front clamping teeth to secure the base to the grating;
   a lateral restrainer configured to restrain lateral displacement and lateral shifting of the vehicle relative to the grating; and
   a face-plate attached to the load transferor by a hinge pin, said face-plate including:
   a body having a front side, a back side, an upper portion, and a lower portion,
   a plurality of spaced-apart arms connected to and extending from the body, and
   a plurality of spaced apart engagement pins mounted in and extending from the back side at a bottom of the body and configured to be inserted into cavities in a front face of the forward support member, each said engagement pin including a mounting head and an engagement leg connected to and extending from the mounting head, said engagement leg includes an attachment end attached to the mounting head and an opposite free end, said engagement leg including a bottom engagement wall, an inner engagement wall, and an outer engagement wall which define an engagement slot between the attachment end and the opposite free end.

2. The vehicle wheel chock of claim 1, wherein for each engagement pin, the mounting head defines at least one pin receipt hole, each pin receipt hole configured to receive an attachment pin.

3. The vehicle wheel chock of claim 1, wherein each engagement pin is made from stainless steel.

4. The vehicle wheel chock of claim 1, wherein each engagement pin is molded into the body of the face-plate.

5. The vehicle wheel chock of claim 1, which defines a plurality of openings configured to receive an upper portion of a U-shaped hinge pin, and a plurality of hinge pin slots configured to receive a lower portion of the U-shaped hinge pin.

6. The vehicle wheel chock of claim 5, wherein the plurality of openings extend through the arms of the face-plate, and wherein the plurality of hinge pin slots are on opposite ends of the body of the face-plate.

7. A vehicle wheel chock face-plate for a vehicle wheel chock for a vehicle on a grating, said vehicle wheel chock including (a) a base having a plurality of studs configured to fit into openings in the grating, (b) a load transferor pivotally connected to a rear end of the base, (c) a plurality of front clamping teeth attached to a front end of the base, (d) a locking assembly configured to co-act with the front clamping teeth to secure the base to the grating, and (e) a lateral restrainer configured to restrain lateral displacement and lateral shifting of the vehicle relative to the grating, said vehicle wheel chock face-plate comprising:
   a body having a front side, a back side, an upper portion, and a lower portion;
   a plurality of spaced-apart arms connected to and extending from the body; and
   a plurality of spaced apart engagement pins mounted in and extending from the back side at a bottom of the body and configured to be inserted into cavities in a front face of a forward support member, each said engagement pin including a mounting head and an engagement leg connected to and extending from the mounting head, said engagement leg includes an attachment end attached to the mounting head and an opposite free end, said engagement leg including a bottom engagement wall, an inner engagement wall, and an outer engagement wall which define an engagement slot between the attachment end and the opposite free end.

8. The vehicle wheel chock face-plate of claim 7, wherein for each engagement pin, the mounting head defines at least one pin receipt hole, each pin receipt hole configured to receive an attachment pin.

9. The vehicle wheel chock face-plate of claim 7, wherein each engagement pin is made from stainless steel.

10. The vehicle wheel chock face-plate of claim 7, wherein each engagement pin is molded into the body of the face-plate.

11. The vehicle wheel chock face-plate of claim 7, which defines a plurality of openings configured to receive an upper portion of a U-shaped hinge pin, and a plurality of hinge pin slots configured to receive a lower portion of the U-shaped hinge pin.

12. The vehicle wheel chock face-plate of claim 11, wherein the plurality of openings extend through the arms, and wherein the plurality of hinge pin slots are on opposite ends of the body of the face-plate.

13. A vehicle wheel chock for a vehicle on a grating, said vehicle wheel chock comprising:
   a base having a plurality of studs configured to fit into openings in the grating, said base including a forward support member;
   a load transferor pivotally connected to a rear end of the base;
   a plurality of front clamping teeth attached to a front end of the base;
   a locking assembly configured to co-act with the front clamping teeth to secure the base to the grating;
   a lateral restrainer configured to restrain lateral displacement and lateral shifting of the vehicle relative to the grating; and
   a face-plate attached to the load transferor by a hinge pin, said face-plate including:
   a body having a front side, a back side, an upper portion, and a lower portion,
   a plurality of spaced-apart arms connected to and extending from the body, and
   a plurality of spaced apart engagement pins mounted in and extending from the back side at a bottom of the body and configured to be inserted into cavities in a front face of the forward support member, each said engagement pin including a mounting head and an engagement leg connected to and extending from the mounting head, said engagement leg includes an attachment end attached to the mounting head and an opposite free end, said engagement leg including a bottom engagement wall and an outer engagement wall which partially define an engagement slot between the mounting head and the opposite free end of the engagement leg.

14. The vehicle wheel chock of claim 13, wherein for each engagement pin, the mounting head defines at least one pin receipt hole, each pin receipt hole configured to receive an attachment pin.

15. The vehicle wheel chock of claim 13, wherein each engagement pin is made from stainless steel.

16. The vehicle wheel chock of claim 13, wherein each engagement pin is molded into the body of the face-plate.

17. The vehicle wheel chock of claim 13, which defines a plurality of openings configured to receive an upper portion of a U-shaped hinge pin, and a plurality of hinge pin slots configured to receive a lower portion of the U-shaped hinge pin.

18. The vehicle wheel chock of claim 17, wherein the plurality of openings extend through the arms of the face-plate, and wherein the plurality of hinge pin slots are on opposite ends of the body of the face-plate.

19. A vehicle wheel chock face-plate for a vehicle wheel chock for a vehicle on a grating, said vehicle wheel chock including (a) a base having a plurality of studs configured to fit into openings in the grating, (b) a load transferor pivotally connected to a rear end of the base, (c) a plurality of front clamping teeth attached to a front end of the base, (d) a locking assembly configured to co-act with the front clamping teeth to secure the base to the grating, and (e) a lateral restrainer configured to restrain lateral displacement and lateral shifting of the vehicle relative to the grating, said vehicle wheel chock face-plate comprising:
   a body having a front side, a back side, an upper portion, and a lower portion;
   a plurality of spaced-apart arms connected to and extending from the body; and
   a plurality of spaced apart engagement pins mounted in and extending from the back side at a bottom of the body and configured to be inserted into cavities in a front face of a forward support member of the vehicle wheel chock, each said engagement pin including a mounting head and an engagement leg connected to and extending from the mounting head, said engagement leg includes an attachment end attached to the mounting head and an opposite free end, said engagement leg including a bottom engagement wall and an outer engagement wall which partially define an engagement slot between the mounting head and the opposite free end of the engagement leg.

20. The vehicle wheel chock face-plate of claim 19, wherein for each engagement pin, the mounting head defines at least one pin receipt hole, each pin receipt hole configured to receive an attachment pin.

21. The vehicle wheel chock face-plate of claim 19, wherein each engagement pin is made from stainless steel.

22. The vehicle wheel chock face-plate of claim 19, wherein each engagement pin is molded into the body of the face-plate.

23. The vehicle wheel chock face-plate of claim 19, which defines a plurality of openings configured to receive an upper portion of a U-shaped hinge pin, and a plurality of hinge pin slots configured to receive a lower portion of the U-shaped hinge pin.

24. The vehicle wheel chock face-plate of claim 23, wherein the plurality of openings extend through the arms, and wherein the plurality of hinge pin slots are on opposite ends of the body of the face-plate.

* * * * *